(12) United States Patent
Seamons et al.

(10) Patent No.: US 7,228,291 B2
(45) Date of Patent: Jun. 5, 2007

(54) AUTOMATED TRUST NEGOTIATION

(75) Inventors: Kent E. Seamons, Cedar Hills, UT (US); William H. Winsborough, Rockville, MD (US)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 09/800,641

(22) Filed: Mar. 7, 2001

(65) Prior Publication Data

US 2002/0016777 A1    Feb. 7, 2002

(51) Int. Cl.
G06Q 4/00    (2006.01)
(52) U.S. Cl. .................. 705/37; 709/229; 713/169; 713/155; 705/76
(58) Field of Classification Search .............. 705/76
See application file for complete search history.

(56) References Cited

U.S. PATENT DOCUMENTS 5,826,245 A * 10/1998 Sandberg-Diment ......... 705/44

FOREIGN PATENT DOCUMENTS

EP    0 745 961 A2 * 12/1996

OTHER PUBLICATIONS

"VerticalNet and VeriSign Sign Strategic Agreement to Deliver Trusted Environment for Online B2B Transactions"; PR Newswire; New York: Dec. 11, 2000. (4 pages).*

E. Bina, V. Jones, R. McCool, and M. Winslett, "Secure Access to Data Over the Internet", Proceedings of the Third ACM/IEEE International Conference on Parallel and Distributed Information Systems, Austin, Texas, Sep. 1994.
M. Blaze, J. Feigenbuam, J. Ioannidis, and A. Keromytis, "The KeyNote Trust Management system", work in progress, Internet draft, Mar. 1999.
M. Blaze, J. Feigenbuam, and A.D. Keromytis, "KeyNote: Trust Management for Public-Key Infrastructures", Cambridge 1998 Security Protocols International Workshop, England, 1998.

(Continued)

*Primary Examiner*—Richard E. Chilcot, Jr.
*Assistant Examiner*—Jennifer Liversedge
(74) *Attorney, Agent, or Firm*—John D. Flynn, Esq.; Steven M. Greenberg, Esq.; Carey, Rodriguez, Greenberg & Paul, LLP

(57) ABSTRACT

A method and data processing apparatus for performing automated trust negotiations between first and second parties connected over a network can include providing each party with a set of credentials. The method also can include classifying one or more credentials in the set of credentials for the first party as sensitive, such that they can only be disclosed to another party subject to certain predetermined criteria. The method further can include establishing negotiations over the network between the first and second parties in order to complete a desired transaction, wherein the transaction is only authorized to proceed if at least one of the parties receives certain predetermined credentials from the other party. Finally, the method can include transmitting at least one of the one or more sensitive credentials from the first party to the second party as part of said negotiations, subject to the first party previously receiving from the second party one or more credentials that satisfy said certain predetermined criteria.

8 Claims, 3 Drawing Sheets

OTHER PUBLICATIONS

M. Blaze, J. Feigenbuam, and J. Iacy, "Decentralized Trust Management", 1996 IEEE Conference on Privacy and Security, Oakland 1996.

N. Ching, V. Jones, and M. Winslett, "Authorization in the Digital Library: Secure Access to Services Across Enterprise Boundaries", Proceedings of ADL '96—Forum on Research and Technology Advances in Digital Libraries, Washington, DC, May 1996.

T. Dierks, C. Allen, "The TLS Protocol Version 1.0", Network Working Group, Jan. 1999, http://www.ietf.org/rfc/rfc2246.txt.

A. Frier, P. Karlton, and P. Kocher, "The SSL 3.0 Protocol", Netscape Communications Corp., Nov. 1996; http://home.netscape.com/eng/ss13/draft302.txt.

N. Li, J. Feigenbaum, and B. Grosof, "A Logic-based Knowledge Representation for Authorization with Delegation" (extended abstract), Proceedings of the 12th Computer Security Foundations Workshop, IEEE Computer Society Press, Los Alamitos, 1999, pp. 162-174.

N. Li, B. Grosof and J. Feigenbaum, "A Practically Implementable and Tractable Delegation Logic", Proceedings of the 2000 IEEE Symposium on Security and Privacy.

W. Johnston, S. Mudumbai, and M. Thompson, "Authorization and Attribute Certificates for Widely Distributed Access Control", Proceedings of the IEEE 7th International Workshops on Enabling Technologies: Infrastructure for Collaborative Enterprises-WETICE '98.

A. Herzberg, J. Mihaeli, Y. Mass, D. Naor, and Y. Ravid, "Access Control Meets Public Key Infrastructure, Or: Assigning Roles to Strangers", IBM Haifa Research Laboratory, http://www.hrl.il.ibm.com.

"The Trust Policy Language", IBM Haifa Research Laboratory, http://www.hrl.il.ibm.com/TrustEstablishment/PolicyLanguage.html.

K. Seamons, W. Winsborough, and M. Winslett, "Internet Credential Acceptance Policies", Proceedings of the 2nd International Workshop on Logic Programming Tools for Internet Aplications, Leuven, Belgium, Jul. 1997.

W. Winsborough, K. Seamons, and V. Jones, "Automated Trust Negotiation: Managing Disclosure of Sensitive Credentials", Transarc Research White Paper, May 1999.

W. Winsborough, K. Seamons, and V. Jones, "Negotiating Disclosure of Sensitive Credentials", Second Conference on Security in Communication Networks '99, Amalfi, Italy, Sep. 1999.

W. Winsborough, K. Seamons, and V. Jones, "Automated Trust Negotiation", DARPA Information Survivability Conference and Exposition (DISCEX '2000), Jan. 2000.

M. Winslett, N. Ching, V. Jones, and I. Slepchin, "Using Digital Credentials on the World-Wide Web", Journal of Computer Security, 5, 1997.

"Simple Public Key Infrastructure (SPKI)", http://www.ietf.org/html.charters/spki-charter.html.

International Telecommunication Union, Recommendation X.509, "Information Technology—Open Systems Interconnection—The Directory: Authentication Framework", Aug. 1997.

* cited by examiner

FIG. 2

Server Credentials

Ref₁
type = reference
relationship = shipper
issuer = manufacturer 1.
owner = A1 Shipping Ref₂
type = reference
relationship = shipper
issuer = manufacturer 2.
owner = A1 Shipping B-Org-S
type = businessOrgMember
rating = good
issuer = Intl. Shippers Assoc.
owner = A1 Shipping Credit
type = credit
amount = $15,000
issuer = Mattress Bank
owner = Acme Widget

Client Credentials

Contract
type = contract
deliveryLocation = Vancouver
issuer = Widget Outlet
owner = Acme Widget Warehouse
type = lease
location = Hong Kong
issuer = Port of Hong Kong
owner = Acme Widget B-Org-C
type = businessOrgMember
rating = excellent
issuer = Better Widget Bureau
owner = Acme Widget

AUTOMATED TRUST NEGOTIATION

This invention was made with Government support under Contract F30602-98-C-0222 awarded by the Air Force. The Government has certain rights in this invention.

CROSS REFERENCE TO RELATED APPLICATIONS

This application is an improvement on the inventors' prior U.S. patent application Ser. No. 09/260,249, filed Mar. 2, 1999 (IBM docket number UK9-99-007) entitled "TRUST NEGOTIATION IN A CLIENT/SERVER DATA PROCESSING NETWORK USING AUTOMATIC INCREMENTAL CREDENTIAL DISCLOSURE" which is commonly assigned with the present application. The PCT application corresponding to this related application has been published on Sep. 8, 2000, under the publication number WO00/52557.

BACKGROUND OF THE INVENTION

The present invention relates to the problem of distributed software components, and how such components can communicate in a is reliable and secure context, for example in an e-business environment.

Distributed software subjects face the problem of determining one another's trustworthiness. Current mainstream approaches to establishing trust presume that communicating subjects are already familiar with one another. There are essentially two approaches based on this assumption. The first is identity-based: identifying a subject is often a sufficient basis for doing business. The second is capability-based: subjects obtain capabilities that are specific to the resources they wish to use. Both approaches require that familiarity be established out of band. Identity- and capability-based approaches are both unable to establish trust between complete strangers. Other solutions are needed in open systems, such as the web, where the assumption of familiarity is invalid.

Property-based digital credentials [1] (see the end of this description for full details of references) (or simply credentials) are the on-line analogues of paper credentials that people carry in their wallets. They present a promising approach to trust establishment in open systems. Credentials, which generalize the notion of attribute certificates [22], can authenticate not just the subject's identity, but arbitrary properties of a subject and its relationships with other subjects. Those properties can be used, for instance, when a client attaches appropriate credentials to service requests, to support service authorization.

Trust establishment between strangers is particularly important in the context of e-business. Credential exchange between strangers promises to enable software agents to establish trust automatically with potential business partners. For instance, a software agent might be charged with finding new candidate suppliers of commodity goods and services. Even when an automatically generated list of such candidates eventually would be culled by a human, information such as requirements and availability of the desired goods might be sensitive, requiring trust establishment as part of the automated process of identifying candidates.

Credential-based authentication and authorization systems can be divided into three groups: identity-based, property-based, and capability-based systems. The original, public key certificates, such as X.509 [22] and PGP [20], simply bind keys to names (although X.509 version 3 certificates later extended this binding to general properties). Such certificates form the foundation of identity-based systems, which authenticate a subject's identity or name and use it as the basis for authorization. Identity is not a useful basis for our aim of establishing trust among strangers. Property-based credentials were introduced by Bina et al. [1] to incorporate the binding of arbitrary attributes. Trust establishment between strangers can be based on the properties of the subjects without requiring prior contact between subjects or their designees. Systems have emerged recently that use property-based credentials to manage trust in decentralized, distributed systems [6][12][15][18]. Capability-based systems [2][3][4][21], discussed further below, manage delegation of authority to operate on a particular application. Pure capability-based systems are not designed for establishing trust between strangers, since clients are assumed to possess credentials that authorize specific actions with the application server.

Winslett et al. [19] focus on establishing trust between strangers. They present an architecture for using credentials to authorize access to distributed resources. Client and server security assistants manage both the credentials and the policies governing access to sensitive resources. They emphasize the need for credential and policy exchange with little intervention by the client. Seamons et al. [15] continue in this vein, developing policies written in Prolog that use credentials and credential attributes to authenticate clients to roles that have attributes, which can be used in authorization decisions. This work addresses credential sensitivity by using mobile policies to support private client selection of credentials to submit for authorization.

Johnston et al. [11] use both attribute certificates (property-based credentials) and use-condition certificates (policy assertions) to determine access control. Use condition certificates enable multiple, distributed stakeholders to share control over access to resources. In their architecture, the policy evaluation engine retrieves the certificates associated with a user to determine whether all use conditions are met. The certificates are assumed not to be sensitive.

The Trust Establishment Project at the IBM Haifa Research Laboratory [12][13] has developed a system for establishing trust between strangers according to policies that specify constraints on attribute-contents of public-key certificates. Servers use a collector to gather supporting credentials from issuer sites. The system assumes that credentials are not sensitive. The companion Trust Policy Language (TPL) is a special-purpose logic programming language, with XML syntax, that maps certificate holders to roles. TPL policies also map the issuers of each supporting credential to a role. These roles can be used by existing role-based access control mechanisms.

The capability-based KeyNote system of Blaze et al. [2][3][4] manages delegation of authority. A KeyNote credential is an assertion that describes the conditions under which one principal authorizes actions requested by other principals. A policy is also an assertion that delegates authority on behalf of the associated application to otherwise untrusted principals. Thus an application's policy defines the root of all delegation chains. KeyNote credentials express delegation of authority in terms of actions that are relevant to a given application.

KeyNote policies do not interpret the meaning of credentials for the application. This is unlike policies designed for use with property-based credentials, which derive roles from credential attributes, or otherwise bridge the divide between the application and credentials that were issued for unrelated purposes. The IETF Simple Public Key Infrastructure [21]

uses a similar approach to that of KeyNote by embedding authorizations directly in certificates.

The Delegation Logic (DL) of Li et al. [9] [10] combines aspects of capability and property-based approaches. While this logically well-founded model focuses directly on authorization, rather than on authenticating subjects to roles, it allows authorizations to be delegated based on properties of subjects, which can be represented by DL credentials.

SSL [6], the predominant credential-exchange mechanism in use on the web today, and its successor TLS [6][7], support credential exchange during client and server authentication. There is no opportunity for the server to authenticate any information about the client before disclosing server credentials. That is, sensitive server credentials cannot be protected. Furthermore, if the credential disclosed by the server does not satisfy the client, the client has no opportunity to request additional credentials from the server. This presents a serious problem when the client and server are strangers: it is unlikely that any single issuer would be an acceptable authority on all server attributes of interest to all potential clients.

Thus a particular problem exists in automated trust establishment between strangers through credential exchange when credentials are themselves potentially sensitive. A sensitive credential contains private information. For instance, access to a credential containing medical information could be restricted to primary care physicians and HMO staff. Access to a credit card credential could be limited to businesses that are authorized to accept a VISA card and that adhere to guidelines for securing credit card numbers. Prior trust establishment systems based on credential exchange have addressed credential sensitivity only manually, requiring a user at the client to decide which credentials to submit to each new service. In 2 addition to requiring human intervention, this approach provides to the human making the trust decision no assistance in evaluating the trustworthiness of the server. A partial solution to these problems is presented in [17] and [18]. However these earlier documents do not disclose any extensive or rigourous analysis of two negotiation strategies, or provide a prototype trust-negotiation system.

SUMMARY OF THE INVENTION

The present invention presents an architecture for client-server applications in which client and server each establishes a credential access policy (CAP) for each of its credentials. A credential is disclosed only when its CAP is satisfied by credentials obtained from the opposing software agent. When an agent needs additional credentials, it can request them. Credentials flow between the client and server through a sequence of alternating credential requests and disclosures, which we call a trust negotiation. A formal, abstract model of trust negotiation is disclosed and then used to specify negotiation strategies.

A negotiation strategy determines characteristics of a negotiation such as which credentials are requested and disclosed, and when the negotiation is halted. Two negotiation strategies are formally specified and analysed herein finding them efficient and effective in establishing trust whenever possible.

The two negotiation strategies differ in the number of credentials that are exchanged. Participants using the first strategy turn over all their credentials as soon as their CAPs are satisfied, without waiting for the credentials to be requested. For this reason we call it an eager strategy. It is simple and clear; however, it discloses more credentials than necessary to achieve most trust requirements. Participants using the second strategy exchange credential requests that focus the credential exchange, achieving a kind of local minimality of disclosures. Because it is stingy with disclosures, we call it a parsimonious strategy. However, it has the drawback that the credential requests can disclose sensitive information about the subjects' credentials and properties. These tradeoffs are investigated below.

BRIEF DESCRIPTION OF THE DRAWINGS

Preferred embodiments of the invention will now be described in detail by way of example only with reference to the following drawings:

FIG. 2 illustrates the set of credentials owned by a client and server;

DETAILED DESCRIPTION

1. Introduction

Figure 1:
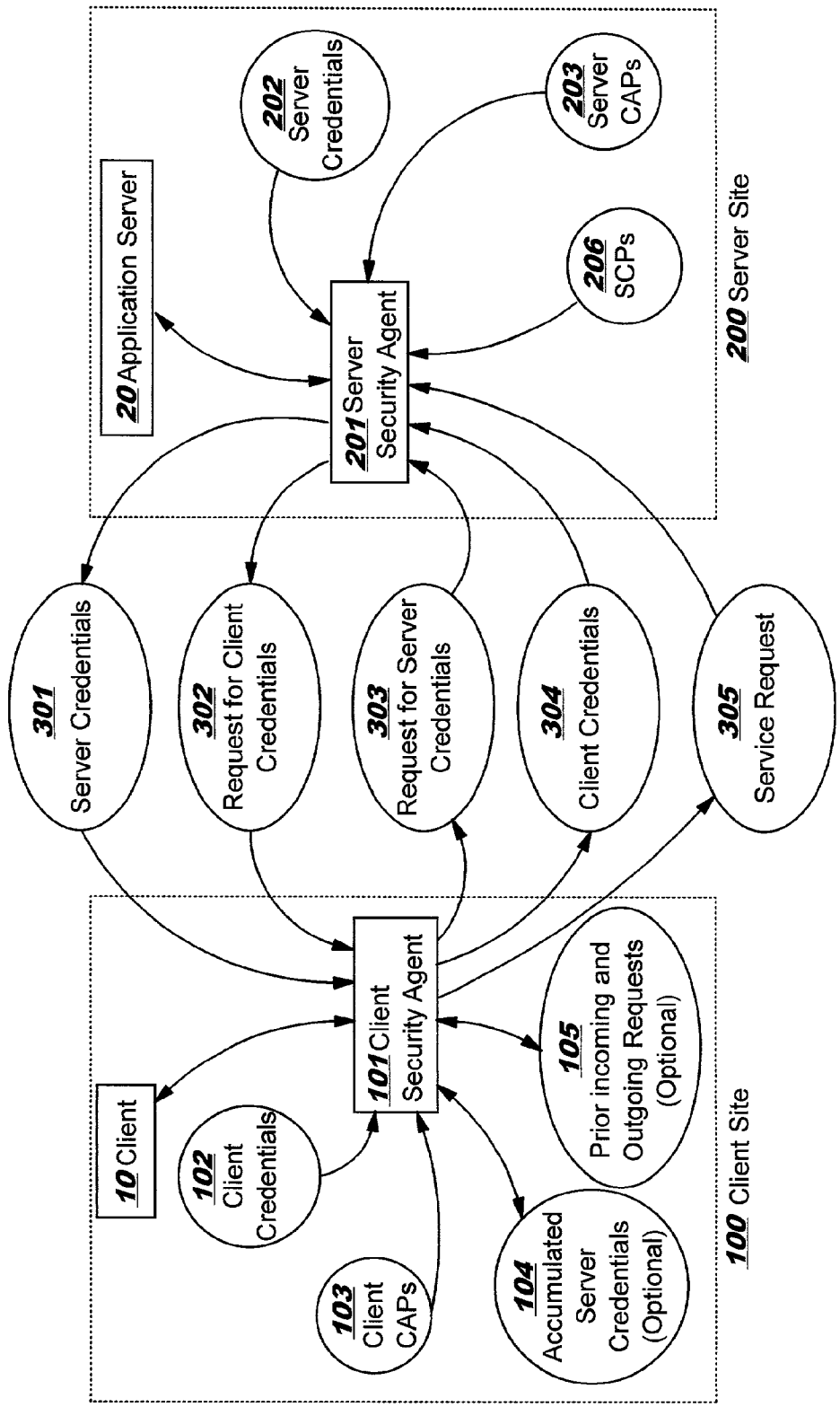
FIG. 1 is a schematic diagram illustrating the role of security agents in trust negotiation.

This detailed description is split into several sections for ease of understanding. Section 2 introduces credentials and explains how they can be used to establish trust between strangers. Section 3 introduces credential sensitivity and the problems it creates. Section 4 presents a trust negotiation architecture and an abstract model of trust negotiation that is used in Section 5, where eager and parsimonious negotiation strategies are formally specified and rigorously analyzed. Section 6 presents two expression languages that can be used within the trust negotiation architecture to express CAPs and credential requests. Section 7 presents two examples of trust negotiation, illustrating the eager and parsimonious negotiation strategies, respectively. Section 9 concludes and discusses future areas of potential research.

2. Credential-based Trust

A credential is a digitally signed assertion by the credential issuer about the credential owner. Credentials can be made unforgeable and verifiable by using modern encryption technology: a credential is signed using the issuer's private key and verified using the issuer's public key [114]. A credential aggregates one or more attributes of the owner, each consisting of an attribute name/value pair and representing some property of the owner asserted by the issuer. For our purposes, a credential is specifically not required to identify the owner. Each credential also contains the public key of the credential owner. The owner can use the corresponding private key to answer challenges or otherwise demonstrate possession of that private key to establish ownership of the credential. The owner can also use the private key to sign another credential, owned by a third subject. In this way, credential chains can be created, with the owner of one credential being the issuer of the next credential in the chain.

Credential chains can be submitted to trace a web of trust from a known subject, the issuer of the first credential in the chain (e.g., subject A in Table 1), to the submitting subject, in which trust is needed. The submitting subject is the owner of the last credential in the chain (e.g., subject C) and can demonstrate ownership of that credential, as outlined above. Supporting credentials are owned by subjects with whom the submitting subject has a direct or indirect relationship, and, although they are not owned by the submitting subject, the submitting entity does collect, keep, and submit copies of them. Each supporting credential contains the public key whose private-key mate signed the next credential in the chain, enabling reliable verification that the attribute claims made in that next credential were made by the owner of the supporting credential.

The submitted credentials attempt to demonstrate a (possibly indirect) relationship between the submitting subject and the known subject that issued the first credential in the chain. The nature of that relationship can be inferred by inspecting the attributes of the credentials in the chain. Multiple chains can be submitted to establish a higher degree of trust or to demonstrate additional properties of the submitting subject and its relationships with known subjects.

TABLE 1

| Type = reference | type = reference |
|---|---|
| Relationship = shippingClient | relationship = shipper |
| Issuer = subjectAKey → | issuer = subjectBKey |
| Owner = subjectBKey | owner = subjectCKey |
| Credential 1 | Credential 2 |

Table 1 shows two credentials forming a chain. Credential 2 was issued by Subject B, the owner of Credential 1. In Credential 1, subject A asserts that subject B is a consumer of shipping services. In Credential 2, subject B asserts that subject C is a shipper. If we trust subject A's judgment that subject B is a consumer of shipping, presumably subject B is in a position to know that subject C is a shipper. Additional credentials owned by subject B can be used to engender trust that subject B is a reliable authority on the asserted attributes of subject C.

A credential expression, $\psi$, is a logical expression over credentials with constraints on their attributes. A credential expression serves to denote the combinations of credentials, C, that satisfy it. We call those combinations the solutions of the expression. For the purpose of trust negotiation, credential expressions can be used to convey requests for credentials between client and server. In this context, credential expressions denote chains of credentials that end with credentials owned by the submitting subject. A credential expression can also be used as a policy governing access to a resource. Access to the resource is granted to a subject when a solution is presented that consists of one or more chains ending in credentials owned by the subject. The resource is unlocked by the solution.

A policy is mobile if it is sent from one subject to another as part of automatic or semiautomatic trust establishment. Mobile policies are used in prior systems to express requirements a client must meet to obtain service. When insufficient credentials accompany a service request, the server returns the service-governing policy (SGP). Communicated in this way, the SGP acts as a request for the credentials needed to unlock the resource. Such mobile policies enable clients to select a set of credentials whose submission will authorize the desired service. The client can then issue a second request for service with those credentials attached, and upon verifying the credentials, the server provides the desired service. Policy mobility has two significant advantages. First, it offloads from the server to the client the work of searching the client's credentials. Second, it enables trust to be established in the client without the client revealing irrelevant credentials.

3. When Credentials are Sensitive

A client wishing to do business with a new service may be unwilling to disclose sensitive credentials until some degree of trust has been established in that service. Current credential systems do not address credential sensitivity. The decision to disclose a sensitive credential to a new service is left up to a user at the client. More specifically, client-credential submission policies specify which credentials can be submitted with any request to a specified class of service and which credentials require explicit authorization before they are submitted. This mechanism requires a user be available to make trust decisions when new service classes are contacted. It does not address how the user decides to trust a service.

In [19], Winslett et al. recognize the potential to use server credentials to establish client trust, though they focused mainly on server trust in clients. They present detailed mechanisms for clients to submit credentials to servers. Each service provider establishes a policy governing access to its resources. Upon receiving a request with insufficient credentials attached-often the case on first access-a security agent representing the server sends the client an explanation of the relevant portions of the policy. The client's agent analyzes the server's policy to determine which credentials are needed to support the service request. It makes a decision on which credentials to send to the server (based on a pre-defined client submission policy and interaction with the user). The client agent then attaches the selected credentials to subsequent requests for the service.

Winslett et al. note the relevance of such machinery for the reverse scenario, in which servers encourage clients by presenting their own credentials, and a client may request credentials from a server. Such a reversal provides a good basis for clients establishing the trust in servers required before disclosing sensitive credentials. However, Winslett et al are unclear about the details of how this kind of trust can be established.

The preferred embodiment of the present invention provides a method of automating the establishment of trust between strangers through incremental exchange of sensitive credentials. One simplistic approach to managing the exchange of sensitive credentials that unfortunately does not work is as follows. The client establishes a policy identifying credentials required from the server prior to the client disclosing any credentials. The client sends this policy to the server as a counter request whenever it receives from the server a credential request, such as a SGP. It would then be useless for the server to request client credentials before disclosing its own credentials, as doing so would introduce a cyclic dependence and deadlock. This simplistic approach fails because it governs all client credentials with the same policy, so each request by the server for client credentials leads to an identical counter request from the client.

4. Negotiation Architecture and Model

Section 4.1 presents a high-level architecture that supports fully automated trust negotiation between client and server. Section 4.2 then introduces an abstract model of trust negotiation. The model is used in Section 5 to formalize and analyze two negotiation strategies.

In both architecture and model, each credential is protected by a CAP that controls the credential's disclosure based on credentials presented by the other negotiation participant. Throughout, credentials are disclosed only in observance of these CAPs. In one of the two negotiation strategies presented in Section 5, credential requests are exchanged to guide the credential exchange.

4.1. Trust Negotiation Architecture

Each of our negotiation participants is represented in trust negotiations by a security agent (SA), as in the simple negotiations of Ching et al. [5] and Winslett et al. [18]. The role of the SA is illustrated in FIG. 1, which depicts the client security agent (101) and the server security agent (201) and several resources and contextual factors that each SA considers during negotiation. The client SA manages the disclosure of client credentials (102) and the server SA manages disclosure of server credentials (202). Like any protected resource, each credential is governed by an access policy (103, 203) that has the same form as a SGP. The CAP identifies credentials from the other negotiation participant that would unlock disclosure of the local credential to that subject.

The client (10) initiates the trust negotiation by making a service request. The client SA intercepts the request and relays it to the server SA. The application service (20) is accessible only via the server SA. Upon receiving a request for service (305), the server SA makes an authorization decision based on the appropriate SGP (206). When the client SA is familiar with the SGP, it can attach appropriate credentials (304) to the service request so that the service will be authorized. The server SA determines whether the credentials that arrive with the service request satisfy the SGP. If the policy is satisfied, the trust negotiation has completed successfully; the service is authorized and the request is forwarded to the application server, which provides the service to the client (this step not shown in figure).

Initially, the client is unfamiliar with the SGP, so attaching satisfactory credentials to an initial service request is impractical. A trust negotiation strategy can overcome this problem by using mobile policies. When a server SA receives a request for service without sufficient credentials attached to satisfy the SGP, it sends the SGP to the client SA as a request for client credentials (302). The client SA can then select a combination of credentials that satisfies the SGP, and can attach those credentials (304) to a repetition of the original service request (305).

An important issue in this scenario not addressed in previous trust systems is how to enable the client SA to make independent trust decisions about which credentials to provide to an unfamiliar server. Our SAs use CAPs (103, 203) when selecting credentials to disclose. If the client SA cannot satisfy the SGP by using credentials whose CAPs are unprotected, it can, as the negotiation instigator, introduce further stages to the trust negotiation by requesting server credentials (303). These stages seek to build mutual trust through credential exchange, eventually to unlock client credentials that satisfy the SGP. Client credentials are unlocked by incoming server credentials (301); however, as an optimization, the client may also cache and use for this purpose server credentials it received in prior stages (104). (The abstract model of trust negotiation introduced in Section 4.2 does not capture this optimization.)

In each negotiation stage, the active subject responds to an incoming request for credentials either by providing credentials, by formulating a counter request for credentials (302, 303), or both. In some strategies, the client SA can also repeat one of its previous request (105) for credentials that has not yet been satisfied. By exchanging credentials and requests for credentials, the two SAs endeavor to establish trust required to authorize service. Eventually, either the negotiation succeeds or the client SA must abandon the attempt. The negotiation succeeds when the client SA satisfies the original SGP by disclosing sufficient unlocked credentials. At the same time, the client SA repeats the original service request (305), this time with sufficient credentials attached (304) to authorize service.

4.2. Trust Negotiation Model

In this section we introduce the abstract model used in Section 5 to define and analyze two negotiation strategies. The abstract model formalizes a trust negotiation as a sequence of credential disclosures that alternate between the two participants, optionally augmented by a sequence of credential requests that serve to guide the disclosures.

The participants in a trust negotiation are the client and server. Each owns a finite set of credentials, which we denote by ClientCreds and ServerCreds, respectively. Access to each credential c in ClientCreds or ServerCreds is governed by a policy, denoted $gov_{client}(c)$ or $gov_{server}(c)$, respectively. If a credential expression, $\psi$, is satisfied by a set of credentials C, we write $sat(C, \psi)$. Credential expressions are required to be monotonic; that is, if $C \subseteq C'$, then $sat(C, \psi)$ implies $sat(C', \psi)$. We write $\psi \equiv \psi'$ if for all credential sets C, $sat(C, \psi)$ iff $sat(C, \psi')$. We do not specify a language of credential expressions here, though an example language is outlined in Section 6. However, in Section 5.2, we do require the language to satisfy the following expressivity requirement: If Creds is any finite set of credentials and $\underline{C}$ is any set of subjects of Creds, then there exists $\psi$ such that for all $C \subseteq$ Creds, $sat(C, \psi)$ iff $C \in \underline{C}$.

If $C \subseteq$ ClientCreds and $c \in$ ServerCreds such that $sat(C, gov_{server}(C))$, or if $C \subseteq$ ServerCreds and $c \in$ ClientCreds such that $sat(C, gov_{client}(c))$, we write $unlocked(c, C)$. If unlocked $(c, \emptyset)$, c is unprotected. Lifting to sets of credentials, C', we write $unlocked(C', C)$ if $unlocked(c, C)$ holds for each $c \in C'$.

A trust negotiation is given by a sequence of credential disclosures, $\{C_i\}_{i \in [0,m]} = C_0, C_1, \ldots, C_m$, for some natural number m. (Throughout we use the notation [i, j] to denote the integer interval from i to j, inclusive). Each disclosure corresponds to a method. $C_0$ models a disclosure by the client to the server. The disclosures then alternate between the two subjects. That is, defining $\{AltCreds_i\}_{0 \leq 1}$ by $AltCreds_i =$ ClientCreds for even i and $AltCreds_i =$ ServerCreds for odd i, we require $C_i \subseteq AltCreds_i$ for all i, $0 \leq i \leq m$.

The credentials in each disclosure are required to be unlocked by credentials from the other negotiation participant in the previous disclosure, which means that the first disclosure consists entirely of credentials that are unprotected. That is, we have $unlocked(C_0, \emptyset)$ and $unlocked(C_{Ci+1}, C_i)$ for all $\leq i \leq m$. Any disclosure can be empty, provided the subsequent disclosure consists of unprotected credentials.

Both client and server may set trust requirements that a trust negotiation may or may not succeed in establishing. Trust requirements are formalized by credential expressions. The trust requirement of primary concern herein is the server's policy governing access to a service: the SGP. However, a client might also set a trust requirement that it enforces before doing business with a server. In negotiation strategies where trust requirements provide a goal that focuses the credential exchange, we call the trust requirements trust targets.

A trust negotiation satisfies a server-set trust requirement, $\psi$, if some client disclosure satisfies $\psi$, i.e., if $sat(C_j, \psi)$ for some even $j \in [0,m]$. A trust negotiation satisfies a client-set trust requirement, $\psi$, if some server disclosure satisfies $\psi$, i.e., if $sat(C_j, \psi)$ for some odd $j \in [0, m]$. In either case, we say that $\{C_i\}_{i \in [0,m]}$ satisfies $\psi$.

In some trust negotiation strategies introduced in Section 5, disclosures are guided by credential requests that are also exchanged by the negotiation participants. Credential requests are formalized by a sequence of credential expressions that accompanies the trust negotiation and that has the same length as the sequence of disclosures. For a given trust negotiation, $\{C_i\}_{i \in [0,m]}$ an accompanying sequence of credential requests has the form $\{\psi_i\}_{i \in [0,m]}$.

5. Negotiation Strategy

In our trust negotiation architecture, the negotiation strategy determines the search for a successful negotiation. The strategy controls which credentials are disclosed, when they are disclosed, and which credentials are requested from the other subject to unlock local credentials. Successful trust negotiation is not always possible. One subject or the other may not possess needed credentials, or subjects may govern their credentials by policies that, together, impose cyclic dependencies. The strategy determines when the negotiation instigator-the client in our architecture-gives up on a negotiation.

Some desirable properties of negotiation strategies are as follows. A strategy should lead to a successful negotiation whenever one exists; that is, it should be complete. It should terminate with failure when success is impossible. Ideally, it should enforce a need-to-know policy, avoiding disclosing credentials that are not needed for the negotiation to succeed and disclosing no credentials when the negotiation fails. Finally, a strategy should be efficient, giving a reasonable bound on the number of messages that must flow during the negotiation. We analyze the extent to which these properties are satisfied by using the abstract model defined in Section 4.2.

Within the context of the abstract model, we identify each negotiation strategy with a set of trust negotiations. This high level of abstraction focuses our attention on the essential relationships between CAPs and the disclosures and requests that flow between client and server SAs in each strategy. Some practical matters are not formalized: what is an effective procedure for constructing counter requests; how to truncate negotiations early when success is impossible; and when do service requests flow? These matters are discussed informally.

This section defines and analyzes two negotiation strategies. The first, our eager strategy, is complete and efficient. However, it does not enforce a need-to-know policy, and discloses many credentials needlessly. The second, our parsimonious strategy, begins by exchanging credential requests, but no credentials, exploring (backwards) all possible sequences of disclosures that lead to the satisfaction of a given trust target. The sequence of requests reaches a request that can be satisfied by unprotected credentials at exactly the point where the backwards exploration of fruitful disclosure sequences reaches the beginning of the shortest sequences. Starting at that point, the strategy performs a credential exchange that is minimal in length and that makes a locally minimal disclosure at each step. Unfortunately, because of limits on the degree of cooperation between the two participants in this strategy, a globally minimal disclosure is not guaranteed.

5.1. An Eager Strategy

In the eager strategy, two security agents take turns sending every credential they have that is currently unlocked. As credentials are exchanged, more credentials become unlocked. The client terminates a negotiation when it receives a set of credentials from the server that it has already received (no new credentials) or the set it receives unlocks no new client credentials. This strategy, as formalized here, does not focus on a particular trust target, but simply expedites a maximal credential exchange.

Definition (Eager Negotiation). A trust negotiation, $\{C_i\}_{i \in [0,m]}$, is an eager negotiation if, 1. for all $0 \leq i \leq m$, $C_i$ is the maximal set such that unlocked$(C_0, \emptyset)$ and unlocked$(C_{i+1}, C_i)$, and,
2. for all $0 \leq i \leq m-3$, $C_i \neq C_{i+2}$, and,
3. if m is even, $C_{m-2} \neq C_m$.

Since it is the client that detects termination, the last disclosure from the server may repeat the server's prior disclosure. In the following discussion, ClientCreds, ServerCreds, gov$_{client}$, and gov$_{server}$, are fixed but arbitrary.

The first therorem gives a tight bound on the number of messages in an eager negotiation: the number of credential disclosures is bounded by the number of credentials each participant has. A tighter bound is the length of the longest chain of dependencies among credentials possessed by the two participants.

Theorem 1 (Efficiency of eager negotiation): The length, m+1, of any eager negotiation, $\{C_i\}_{i \in [0,m]}$, is at most 2×min (|ClientCreds|+1, |ServerCreds|+1).

Proof: A simple induction on i shows that the sequence of client disclosures (even indices) and the sequence of server disclosures (odd indices) are both strictly increasing (with respect to $\subset$), except possibly for the last server disclosure. In general, |S|+1 is the maximum length of a strictly increasing sequence of subsets of a finite set S. If the first server disclosure is empty ($C_1 = \emptyset$), then no new client credentials will be unlocked, so the negotiation terminates with length two. Thus, the length of each of these sequences is bounded by one plus the size of the set from which the disclosures are drawn.

Theorem 2 (Uniqueness of eager negotiation): There is a unique maximal length eager negotiation.

Proof: If we fix two maximal length eager negotiations, a simple induction on the indices shows that corresponding disclosures are identical in the two negotiations.

Theorem 3 (Completeness of eager negotiation): For any credential expression, $\psi$, if there exists any trust negotiation satisfying $\psi$, then the maximal length eager negotiation satisfies $\psi$.

Proof: Consider any trust negotiation $\{C_i\}_{i \in [0,m]}$ satisfying $\psi$. Let $\{C'_i\}_{i \in [0,m']}$ be the unique maximal length eager negotiation. Without loss of generality, we assume that the trust requirement $\psi$, is server-set and we fix an even $n \in [0, m]$ such that sat($C_n$, $\psi$)

If m'<n, we extend the sequence $\{C'_i\}_{i \in [0,m']}$ to $\{C'_i\}_{i \in [0,n]}$ by defining $C'_i$ to be the maximal set such that unlocked($C'_i$, $C'_{i-1}$) for m'<i≤n. This makes the extended sequence alternate the last two values of the original sequence. More precisely, $C'_i = C'_{m'}$ for all i∈[m'+2,n] with the same parity (even or odd) as m' and $C'_i = C'_{m'-1}$ for all i∈[m'+1,n] with the same parity as m'−1.

We now use induction on i to show that $C_i \not\subseteq C'_i$ for all i∈[0,n]. It will then follow from sat($C'_n$, $\psi$) and the monotonicity of sat that sat($C'_n$, $\psi$). Since the extension of $\{C'_i\}_{i \in [0,m']}$ to $\{C'_i\}_{i \in [0,n]}$ just repeats $C_{m'-1}$ and $C_{m'}$, this means $\{C'_i\}_{i \in [0,m']}$ satisfies $\psi$, completing the proof.

Basis: By definition of trust negotiations, an initial disclosure consists entirely of client credentials that are unprotected. That is, $C_0$ satisfied unlocked($C_0$,$\emptyset$). By definition of eager negotiation, an initial disclosure is the maximal set of unprotected client credentials. That is, $C'_0$, is the maximal set of client credentials such that unlocked($C'_0$,$\emptyset$). Thus, $C_0 \not\subseteq C'_0$.

Step: Assume $C_i \not\subseteq C'_i$. $C_{i+1}$ satisfies unlocked($C_{i+1}$, $C_i$) and $C'_{i+1}$ is the maximal set such that unlocked($C'_{i+1}$, $C'_i$). By monotonicity of sat, sat($C_i$, gov(c)) implies sat($C'_i$, gov(c)) for each $C \in C_{i+1}$. It follows that unlocked ($C_{i+1}$, $C'_i$), and hence that $C_{i+1} \subseteq C'_{i+1}$, as required to complete the proof.

Because they exchange credentials as fast as permitted by their CAPs, eager negotiations reach the required level of trust after exchanging a minimal number of messages.

Corollory 4 (Minimality of length of eager negotiation): For any credential expression, $\psi$, if there exists any trust negotiation satisfying $\psi$, then there exists an eager negotiation of equal or lesser length satisfying $\psi$.

Proof: The minimality of length of eager negotiation follows directly from the proof of completeness of eager negotiation (Theorem 3) by fixing the least even $n \in [0, m]$ such that sat($C_n$, $\psi$) and showing that sat($C'_n$, $\psi$).

Several variants of the eager strategy defined above may be deployed in practice. As suggested by Corollary 4, for a given target credential expression, such as the SGP, it is not always necessary to perform an entire eager negotiation. The simplest way to achieve early termination on success has the client repeat its service request with each of its disclosures. When the server receives a message containing both a service request and client credentials, it returns either the service if it is authorized or, otherwise, those of its credentials that are now unlocked. Eventually, either the service is granted, or no new credentials are disclosed and the client terminates the negotiation with failure.

Another variant has the server return the SGP as a credential request, $\psi_1$. In this variant, one may modify slightly the definition of the eager strategy above, making the first two disclosures empty, thereby allowing the service request and SGP to flow before any credentials. After those first two messages, if the client has unprotected credentials that satisfy the SGP, it discloses them with a repeat of the service request, and obtains the service. If the client does not have credentials that satisfy the SGP, it terminates the negotiation without sending any credentials. If the client has satisfactory but locked credentials, it continues the negotiation as above by sending its unlocked credentials and requesting the server's unlocked credentials, now checking at each round whether the SGP can be satisfied yet with its unlocked credentials. Eventually, either the SGP can be satisfied—in which case the client resends the service request along with the required credentials—or the client determines that negotiation has failed.

The strengths of the eager strategy are its simplicity and the fact that no information about credentials possessed is disclosed unless the CAP of the credential in question is satisfied. Its weakness is that it discloses credentials without regard to their relevance to the present negotiation: there is no provision for disclosing on a need-to-know basis.

5.2 A Parsimonious Strategy

Eager negotiations begin exchanging credentials essentially immediately. They make little or no use of credential requests; although one of the variants presented above does call for the SGP to flow as a credential request, even there, until the SGP can be satisfied by unlocked client credentials, all unlocked credentials are exchanged without regard for any credential request. This section defines and analyzes the parsimonious strategy, which differs from the eager strategy in these respects. An intuitive explanation precedes the formal definition. The numbering in this intuitive explanation corresponds to the numbering in the formal definition below.

1. Requests are exchanged to guide the negotiation toward satisfying a particular trust target, $\psi$. In general, this trust target could be a SGP or a trust requirement set by the client. To simplify the presentation, we assume the trust target is a SGP. The specification and ensuing results can easily be generalized to cover the case of a trust target set by the client as well. Under this assumption, the first credential request from the server, $\psi_1$ is the trust target (i.e., the SGP) (The content of $\psi_0$ is irrelevant and undefined).

2. When and if a request is sent that can be satisfied by unprotected (and therefore unlocked) credentials, the negotiation reaches the point of confidence. Corollary 8 and Theorem 9 below together show that when this occurs, the negotiation is bound to succeed.

3. Initial credential disclosures are empty in each stage up to and including the point of confidence. If the point of confidence is never reached, the negotiation terminates without disclosing any credentials.

4. Prior to the point of confidence, each successive credential request is derived from its predecessor in a manner that makes satisfying that request a necessary and sufficient condition for a disclosure to unlock credentials that satisfy the predecessor.

5. After the point of confidence is reached, the client resends its prior requests, going through them backwards, at the same time disclosing appropriate credentials to unlock solutions to those requests.

6. As mentioned above in point 2, when and if a request is sent that can be satisfied by a set of unprotected credentials, a minimal such set is disclosed in the next stage. Each successive step also discloses a minimal credential set that satisfies a credential request, working backwards through the requests that were issued prior to reaching the point of confidence. The client, which drives the negotiation, will have recorded each of the requests that has flowed. It refers to requests it received from the server when selecting its own credential disclosures; it resends the requests it sent to the server, as outlined in point 5 above. Each disclosure unlocks the next, until a disclosure satisfying the original trust target is unlocked.

Definition (Parsimonious Negotiation): Let the target credential expression be $\psi$. To be a parsimonious negotiation with respect to the trust target, $\psi$, a trust negotiation, $\{C_i\}_{i \in [0,m]}$, must be accompanied by a sequence of credential requests, $\{\psi_i\}_{i \in [0,m]}$, and must satisfy the following six requirements:

$\psi = \psi_1$.

2. If there exists a $j \in [1,m]$, and a $C \subseteq AltCreds_{j+1}$, such that sat($C$, $\psi_j$) and unlocked($C, \emptyset$), then, letting k be the least such j, we say that the negotiation reaches the point of confidence at stage k. Otherwise, we let k=m.

3. For all i, $1 \leq i \leq k$, $C_i = \emptyset$.

4. For all i, $1 \leq i \leq k$, $\psi_i$ and $\psi_{i+1}$ have the following relationship:

For all $C \subseteq AltCreds_{i+2}$, we have sat($C$, $\psi_{i+1}$) iff there exists a $C' \subseteq AltCreds_{i+1}$, such that sat($C'$, $\psi_i$) and unlocked ($C'$, $C$).

5. After reaching the point of confidence, prior client requests (which have even indexes) are replayed. If k is even, we require $\psi_{k+j} = \psi_{k-j}$ for even j, $2 \leq j < m-k$ (if any). If k is odd, we require $\psi_{k+j} = \psi_{k-j}$ for odd j, $1 \leq j < m-k$ (if any).

6. If the negotiation reaches the point of confidence at stage k, we require that for all j, $0 \leq j < m-k$, (if any) $C_{k+j+1}$ is a minimal (under $\subseteq$) subset of $AltCreds_{k+j+1}$ satisfying sat($C_{k+j+}$, $\psi_{k-j}$) (and, as for any trust negotiation, unlocked($C_{k+j+1}$, $C_{k+j}$) (recall that $C_k=\emptyset$)).

In Requirement 4, for any $\psi_i$, we know that $\psi_{i+}$ exists by the expressivity requirement on credential expression languages (see Section 4.2). Since each parsimonious negotiation, $\{C_i\}_{i \in [0,m]}$, has an associated sequence of credential requests, $\{\psi_i\}_{i \in [0,m]}$, we often refer to the parsimonious negotiation as the pair $<\{C_i\}_{i \in [0,m]}, \{\psi_i\}_{i \in [0,m]}>$. In the following discussion, ClientCreds, ServerCreds, gov$_{client}$, and gov$_{server}$ are fixed but arbitrary.

Theorem 5 (Determinacy of Requests in Parsimonious Negotiation): Given two parsimonious negotiations, $<\{C_i\}_{i \in [0,m]}, \{\psi_i\}_{i \in [0,m]}>$ and $<\{C'_i\}_{i \in [0,n]}, \{\psi'_i\}_{i \in [0,n]}>$ with equivalent trust targets, $\psi_1 \equiv \psi'_1$, we have $\psi_i \equiv \psi'_i$ for all i, $1 \leq i \leq k$, where k is either the stage where one of the negotiations reaches the point of confidence, m, or n, whichever is least.

Proof: The proof is a straightforward induction on i using the definition of $\equiv$ and Requirement 4 of the definition of parsimonious negotiation.

The next theorem gives a tight bound on the number of possible messages that must flow before the parsimonious strategy determines whether the negotiation will succeed.

Theorem 6 (When success is possible, parsimonious negotiations efficiently reach the point of confidence): Given any credential expression $\psi$, if there exists a trust negotiation that satisfies $\psi$, then we have the following:

1. There exists a natural number $k \leq 2 \times \min(|ClientCreds|+1, |Servercreds|+1)$ such that every parsimonious negotiation $<\{C_i\}_{i \in [0,m]}, \{\psi_i\}_{i \in [0,m]}>$ with $k \leq m$ and trust target $\psi$ reaches the point of confidence at stage k; and
2. Every parsimonious negotiation $<\{C_i\}_{i \in [0,m]}, \{\psi_i\}_{i \in [0,m]}>$ with trust target $\psi$ that has not reached the point of confidence (i.e., m >k) can be extended to a parsimonious negotiation that reaches the point of confidence at stage k.

Proof: Assume there exists a trust negotiation satisfying $\psi$. We begin by showing the first part of the Theorem. By Theorem 3 it follows that there exists an eager negotiation that satisfies $\psi$. Let it be given by $\{C'_i\}_{i \in [0,m']}$. As discussed in the definition of the parsimonious strategy, we have assumed for simplicity that the trust target is an SGP. Let $n' \in [0, m']$ be the least even index such that sat($C'_{n'}$, $\psi$).

Consider any parsimonious negotiation, $<\{C_i\}_{i \in [0,m]}, \{\psi_i\}_{i \in [0,m]}>$ with $n' \leq m$. We use induction on i to prove that, for all $i \in [0, n'-2]$,
1. sat($C'_{n'-i}$, $\psi_{1+i}$), and
2. for all $C \subseteq AltCreds_{n'-i}$ such that sat(C, $\psi_{l+i}$) unlocked(C, $\emptyset$) does not hold.

Note that when n'=0, the result is trivial (there is nothing to prove). So we may assume that $2 \leq n'$.

Basis: sat($C'_{n'}$, $\psi_1$) follows from the assumption that sat($C'_{n'}$, $\psi$) and Requirement 1 of the definition of parsimonious negotiation ("PN Req. 1"), viz. $\psi_1 = \psi$. For the second proof obligation, suppose for contradiction that there exists a $C \subseteq AltCreds_{n'}$=ClientCreds such that sat(C, $\psi_1$) and unlocked(C, $\emptyset$). Then sat($C'_0$, $\psi$), by definition of eager strategy and by monotonicity of sat, so by choice of n', n'=0, which gives the desired contradiction with the assumption that $2 \leq n'$.

Step: Fix any $i \in [0, n'-3]$ and assume that
3. sat($C'_{n'-i}$, $\psi_{1+i}$), and
4. for all $j \in [0, i]$ and all $C \subseteq AltCreds_{n'-j}$ such that sat(C, $\psi_{1+j}$) unlocked(C, $\emptyset$) does not hold.

We show that
5. sat($C'_{n'-(i+l)}$, $\psi_{1+(i+1)}$), and
6. for all $C \subseteq AltCreds_{n'-(i+1)}$ such that sat(C, $\psi_{l+(i+1)}$), unlocked(C, $\emptyset$) does not hold.

From induction assumption (4) and PN Req. 2, it follows that the k introduced in PN Req. 2 has i+1<k. Therefore, by PN Req. 4, $\psi_{i+1}$ and $\psi_{i+2}$ bear the following relationship:

For all C such that $C \subseteq AltCreds_{i+3}$, we have sat(C, $\psi_{i+2}$) if and only if there exists a $C' \subseteq AltCreds_{i+2}$ such that sat(C', $\psi_{i+1}$) and unlocked(C', C).

Taking $C=C'_{n'-(i+1)}$, we have $C \subseteq AltCreds_{i+3}$ because n'-(i+1) and i+3 have the same parity. We show that $C'=C'_{n'-i}$ has the required properties to give us induction obligation (5). First, $C'_{n'-i} \subseteq AltCreds_{i+2}$ holds because n'-i and i+2 have the same parity. Second, sat($C'_{n'-i}$, $\psi_{i+}1$) holds by induction assumption (3). Third, unlocked($C'_{n'-i}$, $C'_{n'-(i+1)}$) is a requirement of the eager strategy.

We now complete the step by proving induction obligation (6). Suppose for contradiction that there is a $C \subseteq AltCreds_{n'-(i+1)}$ such that sat(C, $\psi_{1+(i+1)}$) and unlocked(C, $\emptyset$). By assumption on i, $i+1 \leq n'-2$. We obtain the desired contradiction by proving that sat($C'_{i+1}$, $\psi$), and therefore that n' is not the least even index satisfying sat($C'_{n'}$, $\psi$). For this it is sufficient to show that for each $j \in [0, i+1]$, sat($C'_j$, $\psi_{i+2-j}$) which we now demonstrate by using induction on j.

Basis: sat(C' 0, $\psi_{i+2}$) follows from the assumption that sat(C, $\psi_{i+2}$) the observation that unlocked(C, $\emptyset$) implies $C \subseteq C'_0$, and the monotonicity of sat.

Step: Assume $j \in [0, i]$ and
7. sat($C'_j$, $\psi_{i+2-j}$).

We show
8. sat($C'_{j+1}$, $\psi_{i+2-(j+1)}$).

As noted at the top of the outer induction step, the k introduced in PN Req. 2 has i+1<k. It follows that i+2−(j+1)<k. So PN Req. 4 gives us:

For all C such that $C \subseteq AltCreds_{i+2-j+1}$, sat(C, $\psi_{i+2-j}$) holds if and only if there exists a $C' \subseteq AltCreds_{i+2-j}$ with sat(C', $\psi_{i+2-(j+1)}$) and unlocked(C', C).

Taking $C=C'_j$, we obtain the left-hand side from the induction assumption (7). The right-hand side therefore also holds unlocked(C', $C'_j$) and the eager negotiation requirement that $C'_{j+1}$ be the maximal set satisfying unlocked($C'_{j+1}$, $C'_j$) give us $C' \subseteq C'_{j+1}$. So the obligation (8) follows by monotonicity of sat. This concludes both inductions.

We proceed by analyzing propositions (1) and (2) for the next values of i, viz. i=n'−1 and i=n'. By using the same argument as we used above to prove induction obligation (5), we obtain sat($C'_1$, $\psi_{n'}$). There are now two cases. Either there exists a $C \subseteq AltCreds_1$ such that sat(C, $\psi_{n'}$) and unlocked(C, $\emptyset$), or there does not. In the former case, taking k=n', the parsimonious negotiation reaches the point of confidence at stage k, as desired. In the latter case, we take k=n'+1. When n'=m, there is nothing to prove because the hypothesis of the theorem, $k \leq m$, is not satisfied. When $n'+1 \leq m$, we again use the argument used above to prove induction obligation (5), thereby showing sat($C'_0$, $\psi_{n'+1}$). In this case, the parsimonious negotiation reaches the point of confidence at stage k because unlocked($C'_0$, $\emptyset$) holds by definition of the eager strategy.

For the bound on k, observe that $k \leq m' \leq 2 \times \min(|ClientCreds|+1, |Servercreds|+1)$, the last inequality being Theorem 1.

Now we show the second part of the theorem. Suppose $<\{C_i\}_{i \in [0,m]}, \{\psi_i\}_{i \in [0,m]}>$ has m<k. Recall that for any $i \in [0, k]$, $C_i=\emptyset$ by PN Req. 3. So, to extend the negotiation, we need only find $\psi_{m+1}$ satisfying PN Req. 4. Such a $\psi_{m+1}$ is guaranteed to exist by the expressivity requirement on the credential expression language introduced in Section 4.2. Part one of the current theorem shows that the point of confidence is not reached until stage k. Consequently, this process of extending any shorter parsimonious negotiation can be applied inductively to obtain a parsimonious negotiation that reaches the point of confidence.

The search for a successful parsimonious negotiation is trivial because once the point of confidence is reached, every partial negotiation can be extended to a successful one and every way of extending it is successful.

Definition (Stuck Parsimonious Negotiation): Let $<\{C_i\}_{i \in [0,m]}, \{\psi_i\}_{i \in [0,m]}>$ be a parsimonious negotiation with respect to some trust target $\psi$. $<\{C_i\}_{i \in [0,m]}, \{\psi_i\}_{i \in [0,m]}>$ is stuck if it reaches the point of confidence at some stage k, m<2k, and there is no $C' \subseteq AltCreds_{m+1}$ with $sat(C', \psi_{2k-m})$ and $unlocked(C', C_m)$.

Theorem 7 (Parsimonious negotiations are not stuck): No parsimonious negotiation is stuck.

Proof: Consider any parsimonious negotiation, $<\{C_i\}_{i \in [0,m]}, \{\psi_i\}_{i \in [0,m]}>$ with $k \leq m < 2k$. If k=m, the negotiation is not stuck because by choice of k in PN Req. 2, there exists $C' \subseteq AltCreds_{k+1}$ with $sat(C', \psi_k)$ and $unlocked(C', \emptyset)$. (Note that by PN Req. 3, $C_k = \emptyset$).

We now consider k<m<2k. By taking j=m−k−1 in PN Req. $sat(C_{k+(m-k-1)+1}, \psi_{k-(m-k-1)})$, that is, $sat(C_m, \psi_{2k-m+1})$. By PN Req. 4:

For all $C \subseteq AltCreds_{2k-m+2}$, we have $sat(C, \psi_{2k-m+1})$ iff there exists a $C' \subseteq AltCreds_{2k-m+1}$, such that $sat(C', \psi_{2k-m})$ and $unlocked(C', C)$.

By definition of trust negotiation, $C_m \subseteq AltCreds_m = AltCreds_{2k-m+2}$. So, taking $C=C_m$, it follows that there must exist a $C' \subseteq AltCreds_{2k-m+1}$, such that $sat(C', \psi_{2k-m})$ and $unlocked(C', C_m)$. Since $AltCreds_{m+1} = AltCreds_{2k-m+1}$, this completes the proof.

Corollary 8 (Parsimonious negotiations that reach the point of confidence can be extended): Every parsimonious negotiation that reaches the point of confidence at some stage k can be extended to form a parsimonious negotiation of length 2k+1.

Proof: Follows by inductively applying Theorem 7 to show the existence of a disclosure that can be used to extend the negotiation one step.

Theorem 9 (Parsimonious negotiations that reach the point of confidence and are sufficiently long satisfy their trust targets): Every parsimonious negotiation $<\{C_i\}_{i \in [0,m]}, \{\psi_i\}_{i \in [0,m]}>$ that reaches the point of confidence at some stage k and has m=2k satisfies its trust target.

Proof: By PN Req. 6, $sat(C_{k+(m-k-1)+1}, \psi_{k-(m-k-1)})$. Using m=2k, we get $sat(C_{2k}, \psi_1)$. By PN Req. 1, $\psi_1 = \psi$, completing the proof.

Corollary 10 (Completeness and efficiency of parsimonious negotiation): Given any credential expression $\psi$, if there exists a trust negotiation that satisfies $\psi$, then there exists a natural number $k \leq 2 \times \min(|ClientCreds|, |ServerCreds|)$ such that every parsimonious negotiation with trust target $\psi$ and length 2k+1 satisfies $\psi$. Moreover, every parsimonious negotiation with trust target $\psi$ and length less than 2k+1 can be extended to one with length 2k+1.

Proof: Follows from Theorems 6 and 9 and from Corollary 8.

Theorem 11 (Local minimality of disclosures in parsimonious negotiation): In a parsimonious negotiation, no credential is disclosed until the point of confidence is reached, at which time successful negotiation is guaranteed. Then, each disclosure consists of a minimal (under $\subseteq$) set of credentials sufficient to unlock either the next credential disclosure or the desired service.

Proof: The first part is immediate from PN Req. 3, Corollary 8 and Theorem 9. The second part follows from PN Reqs. 6, 4, and 1.

Any deployment of the parsimonious strategy should take advantage of the fact that, if a successful negotiation exists, the initial exchange of credential requests will encounter a request that can be satisfied by unprotected credentials within the first 2×|ClientCreds| requests. If such a request has not occurred, the negotiation should be terminated.

An issue that must be faced in deploying this strategy is the effective derivation of credential requests that satisfy Requirement 4. In principle, these counter requests can be constructed, provided the credential language is able to represent logical "and" and "or". A "brute-force" approach constructs counter requests as follows. Assume that $\wedge$ and $\vee$ denote "and" and "or", i.e., that for all C, we have $sat(C, \wedge\{\psi_0, \psi_1, \ldots \psi_n\})$ iff $sat(C, \psi_i)$ for each i, $1 \leq i \leq n$ and $sat(C, \vee\{\psi_0, \psi_1, \ldots, \psi_n\})$ iff $sat(C, \psi_i)$ for some i, $1 \leq i \leq n$. Counter requests can be computed by the server from the incoming request by using $counter_{server}(\psi) = \vee\{gov_{server}(C) | sat(C, \psi)\}$, where $gov_{server}(C) = \wedge\{gov_{server}(c) | c \in C\}$. Construction of the client's counter requests is analogous. One problem with using this construction in practice is that it entails constructing the set $\{C | sat(C, \psi)\}$, which in general may be very large. It is a matter of future work to construct an efficient method of deriving compact counter requests for the credential expression language presented in Section 6.

Example. We illustrate the parsimonious strategy by simplifying several issues. We ignore the fact that credentials are submitted with supporting credentials, and also the internal structure of credentials. We use very crude credential expression language that treats credentials as propositional variables.

Let ClientCreds={a, b, c, d}, ServerCreds={x, y}, $gov_{client}$={a→∅, b→∅, c→x, d→y}, and $gov_{server}$={x→a∨b, y→a∨b}. In the exchanges, we use ⊥ to represent values that are not determined or used by the parsimonious negotiation. Recall that $\psi_1$ represents the trust target—an SGP: $\psi_0 = \bot$, $\psi_1 = (a \vee d) \wedge (c \wedge b)$, $\psi_2 = x \vee y$, $\psi_3 = a \vee b$, $\psi_4 = x \vee y$, $\psi_5 = \bot$, $\psi_6 = \bot$, $\psi_7 = \bot$; $C_o = \emptyset$, $C_1 = \emptyset$, $C_2 = \emptyset$, $C_3 = \emptyset$, $C_4 = \{a\}$, $C_5 = \{x\}$, $C_6 = \{b, c\}$, $C_7 = \bot$. The total set of credentials disclosed by the client in this negotiation is not minimal, because the client could have disclosed b in $C_4$ instead of a. However, if the client had tried this, the server choice in $C_5$ could instead have been to disclose $\{y\}$, forcing the client to disclose $\{a, d\}$ in $C_6$, which again is not minimal. This example illustrates the difficulty of devising a negotiation strategy in which the two participants cooperate in exchanging a globally minimal set of credentials.

5.3. Hybrid Strategies

This section sketches informally an approach to combining eager and parsimonious strategies in an effort to use each with the credentials for which it is better suited. CAPs can be made two-part, comprising not only a credential expression, but also a flag to select between parsimonious and eager disclosure. A credential flagged for eager disclosure would be disclosed freely to all sites that present credentials that satisfy the credential-expression component of its CAP. One flagged "parsimonious" would be disclosed only as part of a locally minimal exchange and successful negotiation. A hybrid strategy begins with a phase that uses an eager strategy to attempt to negotiate using only credentials flagged for eager disclosure. If success is possible using just those credentials, the negotiation succeeds during the eager phase. If not, phase two uses a parsimonious strategy to attempt to establish trust by using all credentials. Phase two takes advantage of credentials exchanged during phase one.

In a hybrid negotiation, the client determines when phase one has completed unsuccessfully and phase two begins. The client indicates in each request to the server which strategy it is currently employing.

5.4 An Example Trust Negotiation Framework

An example Trust Negotiation Framework will now be described that addresses the problem of establishing trust sufficient to allow disclosure of the credentials that must be exchanged to authorize application-level transactions. It supports assigning different access policies to different credentials, and issuing counter requests that combine the access policies of credentials that solve the incoming request. It also supports constructing counter requests in a way that takes advantage of the credentials already available. The framework consists of an architecture for supporting fully automated trust negotiation between client and server, together with a partial specification of the behavior of the components of the architecture. The framework leaves the functional specification of certain components up to a negotiation strategy, with respect to which the framework is parameterized. Having differing characteristics, different negotiation strategies satisfy different priorities, such as minimizing credential disclosure and negotiating trust successfully whenever possible, as discussed in relation to the eager and parsimonious strategies in the preceding section. One strategy characteristic is which credentials to disclose and when. A second is how to formulate a counter-request, if any, when trust has not yet been established. A third is when to give up on a negotiation, without establishing trust. The framework presented now can accommodate different negotiation strategies, dependent on the negotiation priorities in a particular situation.

Each of the two negotiation participants is represented in trust negotiations by a security agent (SA). The SA manages the disclosure of local-site credentials. In our framework, each locally-owned credential is governed by an access policy, which has the same form as a service-governing policy. The access policy identifies opposing-site credentials that would unlock disclosure of the local-site credential to that opposing site.

Our framework assumes that servers are stateless, although it could be adapted to take advantage of stateful servers. The client initiates the trust negotiation by making a service request. Upon receiving a request for service, the server SA makes an appropriate authorization decision based on a service-governing policy. When the client SA is familiar with the service and its governing policy, it can attach appropriate credentials to the service request so that the service will be authorized. The server SA determines whether the policy governing the requested service is satisfied by such credentials if any. If the policy is satisfied, the service is authorized and the request is forwarded to the server which provides the service to the client. The trust negotiation has completed successfully. Otherwise, the server SA sends the service-governing policy to the client SA as a request for credentials. The client SA can then select a combination of credentials that satisfies the policy, and attach those credentials to a repetition of the original service request, which it previously stored for this purpose.

Our framework enables each SA to decide automatically, based on pre-established credential access policies and without user intervention, which credentials to disclose. If the client SA cannot satisfy the servers request for credentials by using credentials whose access polices are unlocked, it introduces further stages to the trust negotiation. These stages seek to build mutual trust through credential exchange. In each stage, the active entity can respond to a request for credentials by providing credentials, by formulating a counter-request for opposing-site credentials, or both. The client SA, being stateful, can also repeat a previous request for credentials that has not yet been satisfied. By exchanging credentials and requests for credentials, the two entities endeavor to establish the trust required to authorize service. Eventually, either the client SA abandons the attempt to negotiate trust, or the negotiation succeeds. The negotiation succeeds when the client SA can satisfy the original service-governing policy by using client credentials whose access policies are satisfied by available opposing site credentials. In this case, the client SA repeats the original service request with adequate credentials attached to authorize service.

5.5 Functional Specification of the Framework

The following is a functional specification of the framework. The specification of functions in the third group below, CounterToServiceGoverningPolicy CounterToServiceGoverningPolicy, and HandleServerResponseToCredRequest, are determined by the negotiation strategy chosen to instantiate the framework.

The first three expression-evaluation utilities are used to determine if credentials can be disclosed.

Satisfied (expression, credentials) determines whether a credential expression is satisfied by credentials in a given set. If so, it returns a solution. It returns the empty set if no solution exists.

Unlocked (localcredentials, remotecredentials) is used to determine local credentials that can be disclosed. It takes a set of local credentials and a set of remote credentials and returns the subset of the local credentials whose access control policies are satisfied by the remote credentials.

Locked (localCredentials, remotecredentials) is similar to Unlocked, but returns the subset of the local credentials whose access control policies are not satisfied by the remote credentials.

The next five functions are called to end a negotiation stage.

ReturnServiceResultToClient (serviceRequest) is used by the server SA when service is authorized. It invokes the desired service, which then returns the service result to the client.

ReturnServiceGoverningPolicyToClient (policy) is called by the server SA to send a service-governing policy to the client SA.

ExitWithNegotiationFailure ( ) is called by the client SA when it determines that a negotiation has failed. The negotiation terminates and failure is reported by the client SA to the client.

RepeatServiceRequest (clientCredentials) is invoked by the client SA when the negotiation succeeds in unlocking a set of client credentials that satisfy the service governing policy. That set is passed as the functions argument. The function attaches the set of client credentials to the repeated service request, which it sends to the server SA.

SendCounterRequest (request, credentials) is called to send a counter request to the opposing site. It takes an outgoing request for opposing-site credentials and any local credentials to be disclosed. Although the behavior of this function is independent of the negotiation strategy, the form of the request is not.

The next three functions are specified by the negotiation strategy. They are parameters of the framework that must be instantiated to obtain a complete system specification. Although all instances of the framework can use the same type of policy to govern services and credentials, the form of counter requests is, like these functions, determined by the negotiation strategy.

CounterToServiceGoverningPolicy (policy, clientCredentials) is invoked by the client SA when it receives a service governing policy that can be satisfied, but only by using some locked, sensitive credentials. This function determines a counter request for server credentials and sends it to the server SA. It may also send some unlocked client credentials.

HandleRequestForServerCredentials (clientRequest, clientCredentials, serverCredentials) is invoked by the server SA to handle a request from the client SA for server credentials. It takes a client request for server credentials, a set of submitted client credentials, and a set of server credentials. It determines and sends to the client SA a counter request, credentials to disclose, both, or neither.

HandleServerResponseToCredRequest (serverRequest, serverCredentials, clientCredentials) is invoked by the client SA when it gets a response to a request for server credentials. It takes a server request for client credentials, a set of submitted server credentials, either or both of which could be empty, and a set of client credentials. It determines whether the negotiation should be terminated with failure, has succeeded, or should be continued. If the negotiation has succeeded, the function repeats the original service request with appropriate credentials attached. If the negotiation should be continued, a request for credentials is sent to the server SA, possibly with client credentials attached.

The first of the following two functions is invoked by the server SA to handle an incoming request for service. The second is invoked by the client SA when it receives a service governing policy.

HandleRequestForService (serviceRequest, clientCredentials), defined below, is invoked by the server SA to handle an incoming request for service. It takes the service request and any attached credentials. It returns the service result when access is granted and the service governing policy when access is denied.

policy=LookupServiceGoverningPolicy (serviceRequest)
    creds=Satisfied (policy, clientcredentials)
    if (creds) ReturnServiceResultToClient (serviceRequest)
    else ReturnServiceGoverningPolicyToClient (policy)

HandleServiceGoverningPolicy (policy, clientCredentials), defined below, is invoked by the client SA when it receives a service governing policy from the server SA in response to a service request. It repeats the service request if the service governing policy has a solution consisting entirely of unlocked client credentials. Otherwise, if there is a solution that includes some locked, sensitive client credentials, the function sends the server SA a counter request for server credentials to unlock them. If the service governing policy cannot be satisfied at all by the clients credentials, the negotiation has failed.

creds=Satisfied (policy, Unlocked (clientcredentials, Ø))
    if (creds) RepeatServiceRequest (creds)
    else if (Satisfied (policy, clientcredentials))
    CounterToServiceGoverningPolicy (policy, clientCredentials)
    else ExitWithNegotiationFailure( )

6. Credential Expression Languages

Credential expressions could specify combinations of credentials directly, for instance by representing credential requirements as Boolean combinations of specific credentials. However, by layering levels of abstraction, we aim to provide a basis for overcoming the complexity of authenticating strangers by using credentials obtained for other purposes. Deriving relevant properties from such credentials requires care and expertise. It is important to separate this task from that of defining access requirements for individual services and credentials. For this reason, our credential expression language comprises two parts, separating authentication from authorization. For authentication, credentials are mapped to roles; for authorization, access requirements are expressed as combinations of roles. Both parts are needed to define the credential requirements of a given access policy or credential request. Both parts must flow when a policy or credential request is transmitted from one agent to another.

The language we present is incomplete and not a formal language-design proposal. However, two language features, introduced and discussed in this section, reflect important issues that should guide further work in policy languages for trust negotiation. First, role attributes enhance expressiveness. Second, the monotonic relationship between credentials and access is essential in any context where a subject can withhold disclosure of its own credentials.

This section presents our Role-based Authorization Language (RAL) used in the example negotiation presented in Section 7. An authorization policy defined in RAL consists of a role-constraint expression, which expresses requirements for access to the service or credential that it governs. These requirements are expressed in terms of roles of the subject seeking access. These roles are defined by an authentication policy written in our Property-based Authentication Language (PAL), which is also presented in this section. A PAL authentication policy assigns a subject to roles based on subject properties derived from credentials owned by the subject and from the roles of the issuers of those credentials. This assignment is independent of the question of the subject's access to the service. Thus, a PAL role is not a capability, but represents a derived property of the subject.

Section 6.1 introduces PAL, which maps credentials to roles. Section 6.2 then introduces RAL, which uses those roles to define access requirements. Section 6.3 discusses the significance and impact of supporting role attributes.

6.1. Property-based Authentication Language

A PAL authentication policy defines one or more roles. A role is a property of subjects defined in terms of the credentials they possess and the attribute values of those credentials. The notion of assigning subjects to roles based on credentials goes back to Bina et al. [1]. In Seamons et al. [15] policies are Prolog programs. However, with the exception of a few features, PAL is based on the Trust Policy Language (TPL) of Mass et al. [10]. TPL introduced two intertwined innovations, which we adopt: the role is TPL's sole procedural abstraction; TPL assigns a role not only to the submitting subject, but also to each owner of one of the supporting credentials.

PAL's role attributes enhance TPL, as discussed in Section 6.3. PAL also differs from TPL in that roles are monotonic functions of credentials: disclosing more credentials cannot decrease the roles to which a subject authenticates. This is a requirement in trust negotiation because subjects have control over the credentials they disclose, but not the credentials they obtain.

For presentation purposes, we give PAL a concise notation derived from syntax of constraint logic programming languages. A PAL role is a user-defined predicate over the public keys of subjects. Role attributes take the form of additional parameters. A PAL authorization policy consists of a set of rules, each of which has the following form:

role(Attributes, . . . )← CredentialVar:credential Type, . . . , role₁(credentialVar.issuer, Attributes₁), . . . , credentialConstraints, The head of the rule, to the left of the arrow, consists of a single role, applied to an implicit subject key and to zero or more explicit role attributes, illustrated here by Attributes. Together, the rules with the same role in their head define that role. The body of the rule comprises the portion of the rule to the right of the arrow. One or more credential variables are introduced, each by a variable type declaration, as illustrated by CredentialVar:credentialType. The attributes of a credential are denoted with the syntax CredentialVar.attribute. Credential variables and role attributes have names that start with capital letters. Roles, credential types, and credential attributes have names that start with lowercase letters.

Within a given rule, the subject being authenticated owns each credential denoted by a credential variable in that rule. The rule states that the subject can authenticate to the role role with role attributes Attributes if the subject owns a combination of credentials of the designated types such that each of the rule's requirements holds. These requirements are of two kinds. The first requires that the issuer of a credential belongs to a given role. Such an issuer-role constraint is an application of a role to a credential-issuer key and role attribute variables, and is illustrated by role1 (CredentialVar.issuer, attributes1). Note that the subject key (CredentialVar.issuer) is identified explicitly in role applications that appear in a rule body. The issuer attribute of each credential variable must appear in at least one issuer-role constraint. The second kind of requirement is a general constraint on the attributes of the credentials and roles appearing in the rule. These are typically relational expressions, using operators such as =, g, and [. Although not specified herein, user defined functions and operators may also be used. In addition to imposing requirements on the credentials denoted by the credential variables, general constraints serve to define the attributes of the role in the rule head.

TABLE 2

1) hasCredit(Amount)← LetterOfCredit : credit,
    creditor(LetterOfCredit.issuer) ,Amount=LetterOfCredit.amount.
2) creditor( )← Creditor : creditor, self(Creditor.issuer).
3) knownClient( )← Ref : reference, self(Ref.issuer),
    Ref.relationship="shipping client".
4) knownClient( )← Ref1 : reference, Ref2 : reference,
    Ref1.issuer ≠ Ref2.issuer, shipper(Ref1.issuer),
shipper(Ref2.issuer),
    Ref1.relationship="shippingclient", Ref2.relationship="shipping client".
5) shipper( )← Ref : reference, self(Ref.issuer),
Ref.relationship="shipper".
6) shipper( )← Ref1: reference, Ref2 : reference, Ref1.issuer ≠ Ref2.issuer,
    knownClient(Ref1.issuer), knownClient(Ref2.issuer),
    Ref1.relationship="shipper", Ref2.relationship="shipper".

Table 2 shows six PAL rules. The first rule defines one way a subject can be shown to be in the hasCredit role. If the full authentication policy contained other rules that defined hasCredit, those rules would state other ways to authenticate to the role. The rule here states that a subject is in the hasCredit role if it owns a credit credential issued by a subject in the creditor role. The rule also states that role attribute, Amount, is defined by credential attribute, amount.

To be satisfied, the rule must be evaluated in the presence of the credit credential mentioned above, as well as credentials, owned by the credit credentials issuer, that satisfy a rule defining the creditor role. The second rule shown in Table 2 is such a rule. It states that a subject is in the creditor role if it owns a creditor credential issued by a member of the self role. The self role is unlike other roles. It is predefined and its sole member is the owner of the policy, referred to as self. A credential issued by the policy owner is a self-signed credential [12]. Unlike other credentials, self-signed credentials are part of an authentication policy; they define the valid roots of all credential chains. A chain of credentials that supports membership in the hasCredit ($10,000) role is shown in Table 3. This illustrates a chain that proves subject A is in the creditor role and subject B is in the hasCredit($10,000) role, as those roles are defined in Table 2.

TABLE 3

| type = creditor | → | type = Credit |
| issuer = SelfKey | | issuer = subjectAKey |
| owner = subjectAKey | | owner = subjectBKey |
| | | amount = $10,000 |
| Credential 1 | | Credential 2 |

By making use of the TPL notion of role as a procedural abstraction mechanism, an authorization policy can trace chains of unbounded length [12]. Rules 3 through 6 in Table 2 define two roles, knownClient and shipper. A subject is in the knownClient or shipper role if it has a corresponding self-signed reference credential from the policy owner. A subject is also in the knownClient role if it has a reference from two shipper members. Similarly, a subject is also in the shipper role if it has a reference from two knownClient members.

To summarize, an authentication policy has three parts: a set of rules, a set of self-signed credentials, and a set of user defined functions. Herein we generally exhibit only the rules. However, in any mobile policy, all three parts must flow.

6.2. Role-based Authorization Language This section introduces the Role-based Authorization Language (RAL). A RAL authorization policy comprises a role-constraint expression, together with a PAL authentication policy defining each role used therein. A role-constraint expression is a logical formula consisting of role applications and attribute constraints combined with the logical connectives AND and OR. (These connectives give exactly the monotonic formulas.) A role application consists of a role name applied to a subject (in the example, just one of the reserved words Client or Server) and role attribute variables. Attribute constraints are arbitrary constraints on the role attributes appearing in the rule. An authorization policy that governs a service may also use service parameter names in these constraints. As in PAL, user defined functions may be used.

Example. The following authorization policy could govern a request for a service that schedules shipping. The parameters of the request are: PickupLocation, Destination, and Tons.

hasCredit(Client, Amount) AND Amount≧Tons×costPerTon(PickupLocation, Destination)

This policy requires that the client be in the hasCredit role with the Amount attribute value at least sufficient to pay the cost of the desired shipping. The function costPerTon is user defined.

When an authorization policy is combined with an authentication policy that defines all the roles it uses, the two together define a set of solutions. Each solution is a minimal set of credentials that proves that the subject in question (client or server) belongs to the required roles with the required attributes.

6.3. Role Attributes

The association between attributes and roles enables the policy writer to make credential attributes, exported as role attributes, available in authorization policies. This enables authorization to depend on attributes-such as credit line, rating, or age-without the inconvenience of defining special purpose roles that impose the constraints within the authentication policy.

Role attributes also have at least two other advantages in the context of TPL-style role definitions. First, by exporting credential attributes, they enable attributes of different credentials in a chain to be compared. For instance, they could be used to compare attributes of a credential owner with attributes of the credential's issuer. Second, role attributes can be used to keep track of and to bound the length of a credential chain. Consider the shipper role defined in Table 2. While it is very convenient to let shippers and shipping clients vouch for each other, as the number of subjects in a chain goes up, the policy writer's confidence in the last subject's role may go down. An attribute, ChainLength, can be added to each of shipper and knownClient. By initializing it to zero in the rules that use self-signed credentials, and incrementing it in each of the (mutually) recursive rules, the length can be computed. An authorization policy can then easily impose an upper bound on the length of acceptable chains.

7. Example Negotiations

This section presents two example trust negotiations based on the eager and parsimonious strategies. In the examples, a negotiation is undertaken to authorize on-line scheduling of shipping services by a small, fictitious widget manufacturer, Acme Widget. The negotiation successfully establishes the trust required to authorize the service request and schedule shipping.

Table 2 and Table 4 present the role definitions used by the authentication portions of the SGP and CAPs, as well as the Similarly, the client's authentication policies that define knownClient also include two self-signed reference credentials, one owned by manufacturer 1 and one by manufacturer 2, both with relationship="shipping client".

TABLE 4

19) reputation(Rating)← Membership : businessOrgMember,
　　businessOrganization(Membership.issuer),
　　Rating=Membership.rating.
20) businessOrganization( )← . . .
21) clientWithAccount(AccountNumber)← Account : account,
　　self(Account.issuer), AccountNumber=Account.number.
22) newShippingClient(Pickup,Delivery)← Destination : contract,
Warehouse : lease,
　　knownBusiness(Destination.issuer),
　　warehouseOwner(Warehouse.issuer), Pickup=Warehouse.location,
　　Delivery=Destination.deliveryLocation.
23) knownBusiness( )← . . .
24) warehouseOwner( ) ← . . .

Table 4 gives role definitions that, together with thosse in Table 2, compose the authentication policies in the examples given in Section 7. We present together the authentication policies defined by the client and the server, as some rules are used by both subjects. Note that three rules are incomplete. Their content and the credentials needed to satisfy them are elided from the example presentation to save space.

Table 5 presents the authorization policy that governs the service requested. In particular, Table 5 illustrates the authorization part of SGP for the service, "Schedule Shipping". Parameters of the service request include: PickupLocation, Destination, and Tons. In the example, the client satisfies this policy by authenticating to the following set of roles: {reputation(Acme Widget, excellent), newShippingClient (Acme Widget, HongKong, Vancouver), hasCredit(Acme Widget, $15,000)}.

TABLE 5 clientWithAccount(Client,AccountNumber) OR
(reputation(Client,Rating) AND Rating $\in$ {good,excellent} AND
　　(knownClient(Client) OR
　　　　(newShippingclient(Client,Pickup,Delivery) AND
　　　　　　PickupLocation=Pickup AND Destination = Delivery)) AND
　　hasCredit(Client,Amount)AND
　　Amount $\geq$ TonsxcostPerTon(PickupLocation,Destination))

requests for credentials that may flow during the negotiation. To save space, we list each rule only once, although it may be used in several places in various policies and credential requests.

Although not shown, the authentication policies include necessary self-signed credentials. In particular, the server's authentication policies that define creditor also include a self-signed creditor credential owned by Mattress Bank.

FIG. 2 shows the credentials owned by each negotiation participant. Each credential is labelled by a name used to refer to it in the example. Table 6 shows the CAPs of each of those credentials only the authorization portion of each policy is shown. The authentication portion comprises the relevant rules from Table 2 and Table 4. The policy by which the client and server, respectively, govern a credential is designated by the credential's name with subscript C and S, respectively.

TABLE 6

Figure 3:
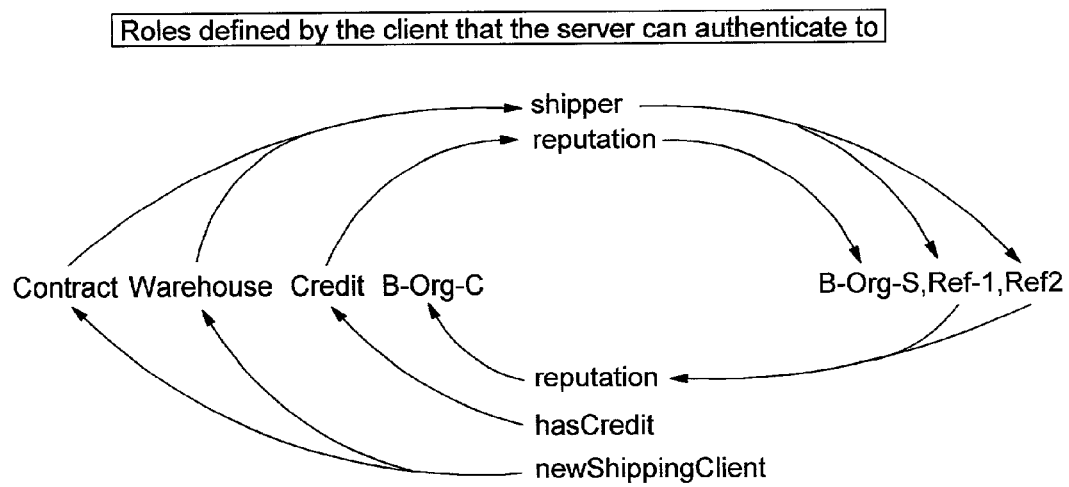
FIG. 3 schematically illustrates the relationship between credentials and roles.

Client Credential Access Policies:

$\text{gov}_{client}$(Contract) $\equiv$ shippr(Server) AND reputation(Server,Rating) AND
　　Rating $\in$ {good, excellent}
$\text{gov}_{client}$(Credit) $\equiv$ reputation(Server, Rating) AND Rating $\in$ {good, excellent}
$\text{gov}_{client}$(Warehouse) $\equiv$ shipper(Server)
$\text{gov}_{client}$(B-Org-C) $\equiv$ true TABLE 6-continued Server Credential Access Policies $gov_{server}(Ref\text{-}1) \equiv reputation(Client, Rating)$ AND $Rating \in \{good, excellent\}$ $gov_{server}(Ref\text{-}2) = reputation(Client, Rating)$ AND $Rating \in \{good, excellent\}$ FIG. 3 shows the dependencies between credentials, roles governing access to those credentials, and credentials that authenticate their owner to a given role. This is presented in the form of a dependency graph showing the client's credentials to the left, the server's credentials to the right, client roles at the bottom, and server roles at the top. Arcs from roles to credentials indicate that authenticating the role depends on verifying the credential. These arcs represent authentication policy information. Arcs from credentials to roles indicate that the credential will be disclosed only to subjects that are authenticated to the role. These arcs represent CAPs.

The negotiation based on the eager strategy consists of the six stages described below (labelled EN). Following the initial request for service in stage 1, each stage shows the unlocked credentials that are disclosed.

EN Stage 1. Client sends (via client SA) request to schedule shipping 5 tons of cargo from Hong Kong to Vancouver.

EN Stage 2. Server SA sends B-Org-S to client.

ENStage 3. Client SA repeats request to schedule shipping and sends B-Org-C, Credit to server.

EN Stage 4. Server SA sends B-Org-S, $Ref_1$, and $Ref_2$.

EN Stage 5. Client SA repeats service request and sends B-Org-C,

Credit, Contract, and Warehouse.

EN Stage 6. Server SA receives service request and authorizes it, as attached credentials satisfy the SGP.

The negotiation based on the parsimonious strategy consists of the eight stages described below (labelled PN). For each stage where an incoming request for credentials is received, the description shows the solution to the request (a list of local-site credentials) that is selected by the SA. Credentials that are locked appear underlined in the solution. Counter requests combine the CAPs of these locked credentials.

PN Stage 1. Client sends (via client SA) request to schedule shipping 5 tons of cargo from Hong Kong to Vancouver.

PN Stage 2. Server SA returns the SGP (Table 4).

PN Stage 3. Client SA's solution to incoming request: Contract, Warehouse, Credit. Outgoing request for credentials: shipper(Server) AND reputation(Server, Rating) AND Rating $\in$ {good, excellent}.

PN Stage 4. Server SA's solution to incoming request: B-Org-S, $Ref_1$, $Ref_2$. Outgoing request for credentials: reputation(Client, Rating) AND Rating $\in$ { good, excellent}.

PN Stage 5. The negotiation reaches the point of confidence. Client SA's solution to incoming request: B-Org-C. Outgoing request for credentials (repeating request sent in Stage 3): shipper(Server) AND reputation(Server, Rating) AND Rating $\in$ {good, excellent}. Outgoing credentials (which solve the request sent by server SA in Stage 4): B-Org-C.

PN Stage 6. Server SA's solution to incoming request: B-Org-S, $Ref_1$, $Ref_2$. Outgoing request for credentials: None. Outgoing credentials: B-Org-S, $Ref_1$, $Ref_2$ PN Stage 7. Client SA repeats service request from Stage 1, attaching credentials that solve the SGP sent by the server SA in Stage 2. Outgoing credentials: Contract, Warehouse, Credit.

PN Stage 8. Server SA receives service request and authorizes it, as attached credentials satisfy the SGP.

8. Demonstration Prototype

We have developed a proof-of-concept demonstration prototype that constitutes the first implementation of trust negotiation. The prototype supports the trivial eager negotiation strategy described in Section 5.1. A description of a real-world trust negotiation scenario and the steps of an actual trust negotiation are available at a web site having an address which requires a user to type into a browser the phrase "http://www." followed by the following text transarc.com/~trg/TrustManagement/ which is herein incorporated by reference. This section describes the prototype's system architecture and underlying technologies, as well as potential further developments.

Figure 4:
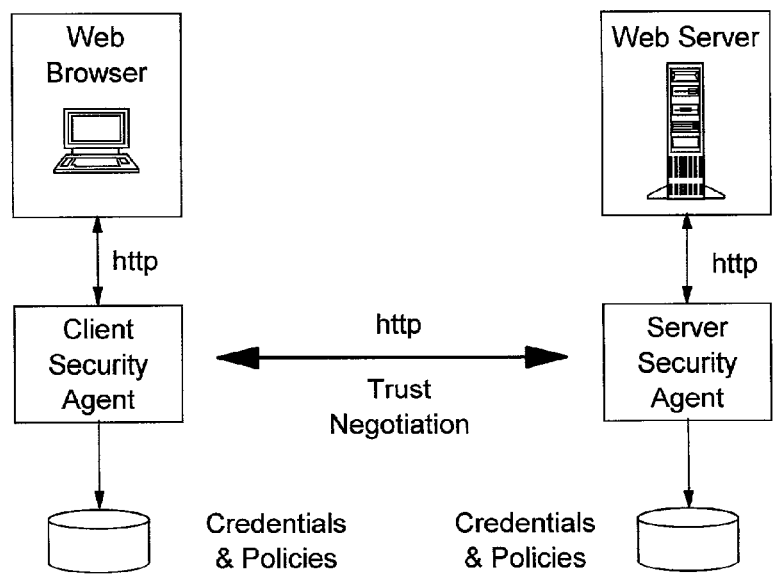
FIG. 4 illustrates a typical Web implementation of trust negotiation.

The prototype's web-based architecture is illustrated in FIG. 4 which illustrates the system architecture for a web-based demonstration prototype of trust negotiation. Security agents serve as proxies for web clients and servers and conduct trust negotiations on their behalf in order for strangers to establish trust and conduct secure transactions over the web. The architecture is built around a standard web browser and web server with security agents managing credentials and access control policies for the client and server. All communication between the web browser, web server, and their associated security agents is done using HTTP. Browser requests are routed through the client security agent. The client security agent conducts trust negotiations on behalf of the client. The agent manages the client's credentials and access control policies that govern disclosure of those credentials.

A secure web server supporting trust negotiation has an associated security agent acting as its proxy. The security agent permits authorized access to secure web services. It does this by verifying that client credentials are submitted that satisfy the service governing policy before forwarding the request to the web server. Whenever a client requests a service without submitting sufficient credentials to gain authorized access, the server security agent responds by disclosing all available server credentials to the client.

The demo utilizes the Trust Establishment Package that was developed at IBM's Haifa Research Center (publicly available from a web site which a user can access by typing into a browser the phrase "http://www." followed by the phase "alphaworks.ibm.com/tech/trustestablishment"). The package provides support for creating X.509v3 certificates, defining role-based authentication policies using XML, and determining whether a given subject has a given role according to a given policy and based on a set of credentials associated with the subject. There are two features of the Trust Establishment Package that are purposely not utilized in the demo. First, the Trust Establishment policy language provides support for requiring that a certain credential does not exist. This language feature is inappropriate in policies used during trust negotiation since each agent controls which credentials it submits. Second, the Trust Establishment system includes a collector used to gather relevant credentials from remote sites. The collector assumes all credentials are freely available, while trust negotiation treats credentials as potentially sensitive. The trust negotiation demo assumes all relevant credentials are available locally. Note that, unlike PAL (see Section 6), TPL does not support role attributes or user defined functions. Consequently, credential expressions in our prototype to not support these features or constraints on service parameters.

The current implementation supports HTTP communication between the web browser, web server, and their associated security agents. The client and server security agents are proxy servers written entirely in Java (trademark of Sun Microsystems Inc). Certificates flow in the body of the HTTP requests and responses in PEM (Privacy Enhanced Mail) certificate format. The agents are multi-threaded and assign a new thread to handle each incoming request.

The speed of trust negotiations will vary depending on the credentials involved, the credential governing policies, and the service governing policy. In the scenario developed for the demo, an example of a successful trust negotiation using the eager strategy takes 8–14 seconds to complete on a 400 MHz desktop computer with a Pentium II processor, the Windows NT 4.0 operating system, and 190 MB of memory (Pentium II and Windows NT are trademarks of Intel Corporation and Microsoft Corporation respectively). The example negotiation takes two round trips between the client and server security agents, including both the initial client request for service and the successful final response from the server granting access to the service. The final access control check that the service governing policy is satisfied verifies a credential chain of length five. The majority of the time during the trust negotiation is spent in the security agents using the Trust Establishment server to answer role membership questions. The function to check a role membership averages 2–5 seconds in the scenario we developed. The Trust Establishment system is a research prototype that has not yet been fine-tuned for high performance.

There are several further extensions desirable for the current prototype to be used in a production environment. The prototype currently lacks a mechanism for a subject to prove ownership of a public key. In practice, a security agent must authenticate the subject submitting a credential chain to be the owner of the leaf credential in the chain. One potential solution is to incorporate SSL as the communication protocol between client and server security agents conducting a trust negotiation. SSL client and server authentication can be used to verify ownership of the public key of both client and server. This solution imposes the restriction that all credentials owned by a subject that are used for trust negotiation during an SSL session must contain the same public key.

The prototype supports credential and service authorization policies as a single, atomic role definition. This capability can be extended to support authorization policies consisting of a monotonic Boolean combination of roles. A simple authorization policy language could be defined using XML, similar to how authentication policies are currently represented.

The prototype stores credentials and policies in flat files. An alternative is to store them in an LDAP directory. The current prototype assumes all supporting credentials are available to the security agent locally. This assumption could be relaxed to support distributed, on-demand gathering of supporting credentials. The Trust Establishment Server from the IBM Haifa Research Lab has a collector feature that supports this functionality. The collector assumes all credentials are freely available. In the future, it is planned to investigate enhancing the collector by using trust negotiation to manage sensitive credentials.

9. Conclusions and Further Work

The model and architecture disclosed herein can be used for negotiating mutual trust between clients and servers through an incremental exchange of potentially sensitive credentials. Two negotiation strategies have been presented, one eager with credential disclosures and one parsimonious. The eager strategy negotiates efficiently, succeeding whenever possible. Its participants exchange no credential requests, nor otherwise attempt to minimize credential disclosures. The drawback is that many credentials are disclosed unnecessarily. However, the strategy reveals no information about any credential that a subject possesses until the credential's CAP is satisfied. There is an advantage in this: credential requests exchanged in the parsimonious strategy could in principle reveal a great deal about which credentials a subject has.

The parsimonious strategy conducts a minimal-length exchange in which each disclosure is a locally minimal set. It does this by conducting an exchange of credential requests that in effect considers every possible successful exchange. It remains open how to ensure that the union of each participant's disclosures is minimal, or whether this is even possible. A strategy that achieves global minimality of credential disclosures in this sense remains a goal.

The strategies presented here assume that both participants cooperate in using the strategy. Further research is required to determine whether and how that assumption can be relaxed or well justified. A parsimonious negotiation guarantees locally minimal credential disclosure only when both parties "bargain in good faith". This means that each SA assumes the following about the other SA. When the other SA responds to an incoming request by issuing a counter request, if that SA subsequently receives credentials that satisfy the counter request, together with a repetition of the original request, it will return credentials that satisfy that original request. One advantage of a hybrid negotiation strategy, such as the one suggested in Section 5.3, is that the eager phase could be used to establish trust that the other negotiation partner will bargain in good faith before entering a parsimonious negotiation.

The architecture presented herein addresses some, but not necessarily all, of the client's trust needs. It addresses the client's need for trust that enables it to disclose credentials to the server, but not the client's need for trust before it requests the service. The architecture could assist in negotiating the server's disclosure of credentials that would establish that trust. However the question remains of how the client formulates its request for those credentials. Such a request could be based, for instance, on transaction type or on the contents of service request parameters. Another open area concerns management of policy information. Negotiation strategies that exchange mobile policy content introduce trust issues that have not yet been addressed. Policy owners may need to protect sensitive policy content. Security agents receiving mobile policy content may need to verify its authenticity and integrity.

Further research can also be usefully directed to dimensions of credential-governing policy that determine or influence negotiation strategy. In addition to the credential expression whose satisfaction unlocks credential disclosure, additional policy content may assist in determining credential disclosures and requests. Two orthogonal issues that a credential-governing policy might address are as follows. The first is whether voluntary credential disclosure is permitted whenever the credential is unlocked or whether the credential must first be explicitly requested (presumably implying that its disclosure is necessary for successful negotiation). The second is whether it is permitted to issue counter requests when the credential is requested, potentially disclosing that the credential is held without disclosing the credential itself. The hybrid strategy presented in Section 5.3 assumes that each credential either can be voluntarily disclosed or can have a counter request issued in an effort to unlock it. A natural generalization captures the other two possibilities: that a credential (1) can both be voluntarily disclosed and have counter requests issued and (2) can neither be voluntarily disclosed nor have counter requests issued. It seems intuitive that some credentials would naturally fall into each of these categories, based, for instance, on whether possession or contents of the credential were more sensitive, and the reasons for the sensitivity.

The potential impact of these policy concepts on hybrid negotiation strategies needs to be examined further. Credentials in the "both" category might enable flexible and focused strategies. Strategies are needed that manage disclosure of credentials whose highly sensitive nature requires the "neither" category.

These credentials should only be disclosed to a partner that requests them and that simultaneously provides sufficient credentials to unlock them. For instance, this could be accomplished by a hybrid strategy with an eager negotiation phase followed by a single request for the most sensitive credentials.

Another policy generalization would group credentials into ordered sensitivity classes. This captures a notion of relative sensitivity not captured by other policy constructs above. Strategies could prefer disclosing credentials in lower sensitivity classes.

The architecture presented here addresses some, but not all, of the client's trust needs. It addresses the client's need for trust that enables it to disclose credentials to the server. It does not address the client's need for trust before it requests service. The architecture could assist in negotiating the server's disclosure of credentials that would establish that trust. However, further work is needed to address the question of how the client formulates its request for those credentials. Such a request could be based, for instance, on transaction type or on the contents of service request parameters. Further work is also desirable in the management of policy information. Negotiation strategies that exchange mibile policy content introduce trust issues that have not yet been addressed. Policy owners may need to protect sensitive policy content. Security agents receiving mobile policy content may need to verify its authenticity and integrity.

9.1 Influences on Strategy

Further research can be usefully directed to dimensions of credential-governing policy that determine or influence negotiation strategy. In addition to the credential expression whose satisfaction unlocks credential disclosure, additional policy content may assist in determining credential disclosures and requests. Two orthogonal issues that a credential-governing policy might address are as follows. The first is whether voluntary credential disclosure is permitted whenever the credential is unlocked or only when the credential is part of a solution to an explicit credential request (presumably implying that disclosure of some solution is necessary for successful negotiation). The second is whether it is permitted to issue counter requests when the credential is requested, potentially disclosing that the credential is held without disclosing the credential itself. The hybrid strategy presented in Section 5.3 assumes that each credential either can be voluntarily disclosed or can have a counter request issued in an effort to unlock it. A natural generalization captures the other two possibilities: that a credential (1) can both be voluntarily disclosed and have counter requests issued and (2) can neither be voluntarily disclosed nor have counter requests issued. It seems intuitive that some credentials would naturally fall into each of these categories, based, for instance, on whether possession or contents of the credential were more sensitive, and the reasons for the sensitivity.

The potential impact of these policy concepts on hybrid negotiation strategies needs to be examined further. Credentials in the "both" category might enable flexible and focused strategies. Strategies are needed that manage disclosure of credentials whose highly sensitive nature requires the "neither" category. These credentials should only be disclosed to a partner that requests them and that simultaneously provides sufficient credentials to unlock them. For instance, this could be accomplished by a hybrid strategy with an eager negotiation phase followed by a single request for the most sensitive credentials.

Another policy generalization would group credentials into ordered sensitivity classes. This captures a notion of relative sensitivity not captured by other policy constructs above. Strategies could prefer disclosing credentials in lower sensitivity classes.

Dynamic factors such as urgency to establish trust may have important influence on strategy in future trust negotiation systems. For instance, the client might determine an urgency factor at the outset of negotiation. This would be an integer drawn from a range of values representing the importance the client associates with obtaining a successful negotiation outcome. The two dimensions of policy content discussed above—permission to voluntarily disclose and permission to issue counter requests—would be represented by integers in the same range of values as the urgency factor. These would be interpreted dynamically during negotiation by comparing them with the current urgency factor to determine whether permission is granted.

Property-based authentication is useful not only when client and server are complete strangers. When multiple organizations form coalitions, such as business partnerships, it may be possible by using property-based authentication to reduce the administrative overhead that changes in coalition membership require. The idea is to authenticate the subject within a partner organization in terms of the subject's role within its home organization, as documented by credentials issued by the home organization. Policies written by the home organization would be used to interpret the credentials issued there. Partner organizations wishing to authenticate the subject would need to define their own roles in terms of the roles defined by the subject's home-organization.

This arrangement raises some interesting linguistic issues. PAL and TPL role definitions define and use roles held by others in relation to the self—the entity enforcing the policy. A policy written at a different organization defines roles in relation to that other organization. PAL and TPL currently have no provisions for defining roles held in relation to the self in terms of roles held in relation to others. In addition to this capability, a further requirement is support for differences in nomenclature used to refer to essentially similar roles at different organizations. A natural solution here is to add first-class roles to the policy language as parametric binary relations. By allowing roles held in relation to others to be used by and passed as parameters into role definitions, we obtain late binding of partner-organization authentication policies, as well as avoiding problems of differing naming conventions between partner organizations. An important issue for trust negotiation will be the impact of these features on the complexity of deriving counter requests in the parsimonious strategy.

The present invention is preferably embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

REFERENCES (nb url's are presented with // replaced by "zz?" to render not directly operative).

[1] E. Bina, V. Jones, R. McCool, and M. Winslett, "Secure Access to Data Over the Internet," Proceedings of the Third ACM/IEEE International Conference on Parallel and Distributed Information Systems, Austin, Tex., September 1994.

[2] M. Blaze, J. Feigenbaum, J. Ioannidis, and A. Keromytis, "The KeyNote Trust Management System," work in progress, Internet Draft, March 1999.

[3] M. Blaze, J. Feigenbaum, and A. D. Keromytis, "KeyNote: Trust Management for Public-Key Infrastructures," Cambridge 1998 Security Protocols International Workshop, England, 1998.

[4] M. Blaze, J. Feigenbaum, and J. Lacy, "Decentralized Trust Management," 1996 *IEEE Conference on Privacy and Security*, Oakland 1996.

[5] N. Ching, V. Jones, and M. Winslett, "Authorization in the Digital Library: Secure Access to Services across Enterprise Boundaries," *Proceedings of ADL '96—Forum on Research and Technology Advances in Digital Libraries*, Washington, D.C., May 1996. Available at http:zz?drl.cs.uiuc.edu/security/pubs.html.

[6] T. Dierks, C. Allen, "The TLS Protocol Version 1.0," draft-ietf-tls-protocol-06.txt, Nov. 12, 1998.

[7] S. Farrell, "TLS Extensions for Attribute Certificate Based Authorization," draft-ietf-tls-attr-cert-01.txt, Aug. 20, 1998.

[8] A. Frier, P. Karlton, and P. Kocher, "The SSL 3.0 Protocol," Netscape Communications Corp., November 1996.

[9] N. Li, J. Feigenbaum, and B Grosof, "A Logic-based Knowledge Representation for Authorization with Delegation" (Extended Abstract), *Proceedings of the* 12th Computer Security Foundations Workshop, IEEE Computer Society Press, Los Alamitos, 1999, pp. 162-174. Full paper available as IBM Research Report RC21492 (96966).

[10] N. Li, B Grosof and J Feigenbaum, "A Practically Implementable and Tractable Delegation Logic", to appear in *Proceedings of the* 2000 *IEEE Sumposium on Security and Privacy.*

[11] W. Johnston, S. Mudumbai, and M. Thompson, "Authorization and Attribute Certificates for Widely Distributed Access Control," *Proceedings of the IEEE 7th International Workshops on Enabling Technologies: Infrastructure for Collaborative Enterprises-WETICE '98.*

[12] A. Herzberg, J. Mihaeli, Y Mass, D. Naor, and Y. Ravid, "Access Control Meets Public Key Infrastructure, Or: Assigning Roles to Strangers," forthcoming, IBM Haifa Research Laboratory (http:zz?www.hrl.il.ibm.com

[13] "The Trust Policy Language," IBM Haifa Research Laboratory (http:zz?www.hrl.il.ibm.com/).

[14] B. Schneier, Applied Cryptography, John Wiley and Sons, Inc., second edition, 1996.

[15] K. Seamons, W. Winsborough, and M. Winslett, "Internet Credential Acceptance Policies," *Proceedings of the 2nd International Workshop on Logic Programming Tools for Internet Applications.* Leuven, Belgium, July 1997. Available at http:zz?clement.info.umoncton.ca/~lpnet/proceedings97/.

[16] W. Winsborough, K. Seamons, and V. Jones, "Automated Trust Negotiation: Managing Disclosure of Sensitive Credentials", Transarc Research White Paper, May 1999.

[17] W. Winsborough, K. Seamons, and V. Jones, "Negotiating Disclosure of Sensitive Credentials," Second Conference on Security in Communication Networks '99, Amalfi, Italy, September 1999.

[18] W. Winsborough, K. Seamons, and V. Jones, "Automated Trust Negotiation" DARPA Information Survivability Conference and Exposition (DISCEX'2000), January 2000.

[19] M. Winslett, N. Ching, V. Jones, and I. Slepchin, "Using Digital Credentials on the World-Wide Web," *Journal of Computer Security,* 5, 1997, 255-267. Available at http:zz?drl.cs.uiuc.edu/security/pubs.html.

[20] P. Zimmerman, PGP User's Guide, MIT Press, Cambridge, 1994.

[21] Simple Public Key Infrastructure (SPKI), http:zz?www.ietf.org/html.charters/spki-charter.html.

[22] International Telecommunication Union, Recommendation X.509—Information Technology—Open Systems Interconnection—The Directory: Authentication Framework, August 1997.

We claim:

1. A method of performing automated trust negotiations between first and second parties connected over a network, said method comprising the steps of:
   providing each party with a set of credentials, wherein a credential provides an authorization of a property of its respective party;
   classifying one or more credentials in the set of credentials for said first party as sensitive;
   establishing negotiations over the network between said first and second parties in order to complete a desired transaction, wherein said transaction is only authorized to proceed if at least one of the parties receives certain predetermined credentials from the other party; and
   transmitting at least one of the one or more sensitive credentials from the first party to the second party as part of said negotiations;
   wherein said first and second parties are a server and a client respectively, wherein said server is to perform the desired transaction in response to a request from the client;
   wherein the server specifies a set of credentials that it must receive from a client in order to set up or perform the transaction;
   wherein both the client and the server have one or more credentials in their respective sets of credentials which are classified as sensitive;
   wherein the negotiations over the network between the client and the server in order to complete a desired transaction include transmitting at least one of the one or more sensitive credentials from the client to the server as part of said negotiations;
   wherein at least one party adopts an eager strategy, according to which all sensitive credentials are transmitted to the other party subject only to receipt of certain predetermined credentials from the other party, irrespective of whether or not transmission of such sensitive credentials is necessary in order to complete said transaction; and
   wherein at least one party adopts a parsimonious strategy, according to which only selected sensitive credentials are transmitted to the other party from the set of sensitive credentials that could be transmitted after receipt of certain predetermined credentials from the other party, said selection being performed on the basis of transmitting only those sensitive credentials that are specifically necessary in order to complete said transaction.

2. The method of claim 1, wherein said first and second parties are a client and a server respectively, wherein said server is to perform the desired transaction in response to a request from the client.

3. The method of claim 2, wherein in order to set up or perform the transaction, the client is required to supply at least one of the one or more sensitive credentials to the server.

4. The method of claim 1, wherein said parsimonious strategy involves the exchange of credential requests to establish a point of confidence prior to transmission of credentials themselves.

5. The method of claim 1, wherein at least one party initially adopts an eager strategy, according to which all sensitive credentials are transmitted to the other party subject only to receipt of certain predetermined credentials from the other party, irrespective of whether or not transmission of such sensitive credentials is necessary in order to complete said transaction, and then at a later stage of said negotiations subsequently adopts a parsimonious strategy, according to which only selected sensitive credentials are transmitted to the other party from the set of sensitive credentials that could be transmitted after receipt of certain predetermined credentials from the other party, said selection being performed on the basis of transmitting only those sensitive credentials that are specifically necessary in order to complete said transaction.

6. The method of claim 1, wherein said server defines a service governing policy that specifies certain roles, such that said client can only set up or perform the transaction if it has sufficient credentials to allow it to assume one of said certain roles.

7. A computer program product stored on a computer readable storage medium for, when run on a computer system, carrying out the steps of:
   providing each party with a set of credentials, wherein a credential provides an authorization of a property of its respective party;
   classifying one or more credentials in the set of credentials for said first party as sensitive;
   establishing negotiations over the network between said first and second parties in order to complete a desired transaction, wherein said transaction is only authorized to proceed if at least one of the parties receives certain predetermined credentials from the other party; and
   transmitting at least one of the one or more sensitive credentials from the first party to the second party as part of said negotiations;
   wherein said first and second parties are a server and a client respectively, wherein said server is to perform the desired transaction in response to a request from the client;
   wherein the server specifies a set of credentials that it must receive from a client in order to set up or perform the transaction;
   wherein both the client and the server have one or more credentials in their respective sets of credentials which are classified as sensitive;
   wherein the negotiations over the network between the client and the server in order to complete a desired transaction include transmitting at least one of the one or more sensitive credentials from the client to the server as part of said negotiations;
   wherein at least one party adopts an eager strategy, according to which all sensitive credentials are transmitted to the other party subject only to receipt of certain predetermined credentials from the other party, irrespective of whether or not transmission of such sensitive credentials is necessary in order to complete said transaction; and
   wherein at least one party adopts a parsimonious strategy, according to which only selected sensitive credentials are transmitted to the other party from the set of sensitive credentials that could be transmitted after receipt of certain predetermined credentials from the other party, said selection being performed on the basis of transmitting only those sensitive credentials that are specifically necessary in order to complete said transaction.

8. A data processing apparatus for use in performing automated trust negotiations between first and second parties connected over a network, the apparatus comprising:
   means for providing a party with a set of credentials, wherein a credential provides an authorization of a property of its respective party;

means for classifying one or more credentials in the set of credentials for said first party as sensitive;

means for establishing negotiations over the network between said first and second parties in order to complete a desired transaction, wherein said transaction is only authorized to proceed if at least one of the parties receives certain predetermined credentials from the other party; and means for transmitting at least one of the one or more sensitive credentials from the first party to the second party as part of said negotiations;

wherein said first and second parties are a server and a client respectively, wherein said server is to perform the desired transaction in response to a request from the client;

wherein the server specifies a set of credentials that it must receive from a client in order to set up or perform the transaction;

wherein both the client and the server have one or more credentials in their respective sets of credentials which are classified as sensitive;

wherein the negotiations over the network between the client and the server in order to complete a desired transaction include transmitting at least one of the one or more sensitive credentials from the client to the server as part of said negotiations;

wherein at least one party adopts an eager strategy, according to which all sensitive credentials are transmitted to the other party subject only to receipt of certain predetermined credentials from the other party, irrespective of whether or not transmission of such sensitive credentials is necessary in order to complete said transaction; and wherein at least one party adopts a parsimonious strategy, according to which only selected sensitive credentials are transmitted to the other party from the set of sensitive credentials that could be transmitted after receipt of certain predetermined credentials from the other party, said selection being performed on the basis of transmitting only those sensitive credentials that are specifically necessary in order to complete said transaction.

* * * * *